US009552400B2

(12) United States Patent
Krishnan et al.

(10) Patent No.: US 9,552,400 B2
(45) Date of Patent: Jan. 24, 2017

(54) DEFINING AND MAPPING APPLICATION INTERFACE SEMANTICS

(71) Applicant: Staples, Inc., Framingham, MA (US)

(72) Inventors: Pavitra Krishnan, Westborough, MA (US); William Jeffrey Bridwell, Roslindale, MA (US); Chandra Shekar Bommasamudra, Shrewsbury, MA (US)

(73) Assignee: Staples, Inc., Framingham, MA (US)

( * ) Notice: Subject to any disclaimer, the term of this patent is extended or adjusted under 35 U.S.C. 154(b) by 334 days.

(21) Appl. No.: 13/906,636

(22) Filed: May 31, 2013

(65) Prior Publication Data

US 2013/0325789 A1 Dec. 5, 2013

Related U.S. Application Data

(60) Provisional application No. 61/654,788, filed on Jun. 1, 2012.

(51) Int. Cl.
*G06F 17/30* (2006.01)
(52) U.S. Cl.
CPC .............. *G06F 17/30563* (2013.01)
(58) Field of Classification Search
CPC ............ G06F 17/30563; G06F 17/2785; G06F 17/30731; G06F 17/30917; G06F 17/30002; G06F 17/30126
See application file for complete search history.

(56) References Cited

U.S. PATENT DOCUMENTS

| 7,213,233 | B1* | 5/2007 | Vinodkrishnan ......... G06F 8/10 714/E11.024 |
| 7,788,238 | B2 | 8/2010 | Gabriel et al. |
| 2008/0147698 | A1* | 6/2008 | Gustafsson et al. .......... 707/101 |
| 2009/0138249 | A1* | 5/2009 | Irassar et al. .................... 703/6 |

(Continued)

FOREIGN PATENT DOCUMENTS

| EP | 0456249 | 12/1998 |
| WO | 00/65486 | 11/2000 |

OTHER PUBLICATIONS

OpenLink Data Explorer, semanticweb.org, Jun. 27, 2009, 1 pg.

(Continued)

*Primary Examiner* — James Trujillo
*Assistant Examiner* — Fatima Mina
(74) *Attorney, Agent, or Firm* — Patent Law Works, LLP

(57) ABSTRACT

An example implementation includes a system having one or more processors, a definition module, a data store, and a workflow module. The definition module is executable by the one or more processors to determine a first semantic element for a first operation included in a first application interface representing a first service and a second semantic element for a second operation included in a second application interface representing a second service, such as an enterprise service bus. The definition module may further determine a mapping of the first semantic element with the second sematic element. The data store is configured to store the mapping of the first semantic element with the second sematic element by the definition module. The workflow module is executable by the one or more processors to integrate the first application interface with the second service based on the mapping.

39 Claims, 19 Drawing Sheets

(56) References Cited

U.S. PATENT DOCUMENTS

| | | | |
|---|---|---|---|
| 2009/0265655 A1* | 10/2009 | Fiedler | 715/780 |
| 2010/0005061 A1 | 1/2010 | Basco et al. | |
| 2010/0023921 A1* | 1/2010 | Chaar et al. | 717/102 |
| 2010/0333073 A1 | 12/2010 | Mills | |
| 2011/0125776 A1 | 5/2011 | Roshen et al. | |
| 2012/0054147 A1* | 3/2012 | Goetz | G06F 17/30563 707/602 |
| 2013/0125053 A1* | 5/2013 | Brunswig et al. | 715/810 |

OTHER PUBLICATIONS

The OpenLink Data Explorer Extension—Example Uses, Mar. 19, 2013, 1 pg.

International Search Report and Written Opinion dated Dec. 20, 2013 in PCT/US2013/043699. (12 pages).

\* cited by examiner

DEFINING AND MAPPING APPLICATION INTERFACE SEMANTICS

CROSS-REFERENCE TO RELATED APPLICATIONS

This application claims the benefit under 35 U.S.C. §119 (e) of U.S. Provisional Application No. 61/654,788, entitled "Application Integration", filed on Jun. 1, 2012, the entire contents of which is incorporated herein by reference.

BACKGROUND

The present disclosure relates to defining and mapping application interface semantics.

Integrating applications with an enterprise system can often be a complex process due to differing characteristics and requirements between the enterprise system and the applications being integrated. A significant amount work and time are generally required to document and understand these differences so the integration can be performed reliably and successfully, which can cause the integration to exceed budgets and deadlines. Additionally, since the application and enterprise environment are dynamic and often undergo changes, maintaining, and scaling the integration of the applications can be unsustainable. Furthermore, current approaches for integrating applications with enterprise systems are often limited in providing for collaboration on shared documents; synchronizing common information across related documents; identifying changes and notifying stakeholders; and providing an effective review and approval cycle.

SUMMARY

According to one innovative aspect of the subject matter in this disclosure, a system includes one or more processors; a definition module; a data store; and a workflow module. The definition module is executable by the one or more processors to determine a first semantic element for a first operation included in a first application interface representing a first service and a second semantic element for a second operation included in a second application interface representing a second service. The definition module is further executable to determine a mapping of the first semantic element with the second sematic element. The data store is configured to store the mapping of the first semantic element with the second sematic element by the definition module. The workflow module is executable by the one or more processors to integrate the first application interface with the second service based on the mapping. The workflow module is coupled to the data store to access the mapping.

In general, another innovative aspect of the subject matter described in this disclosure may be embodied in methods that include determining, using one or more computing devices, a first semantic element for a first operation included in a first application interface representing a first service; determining, using the one or more computing devices, a second semantic element for a second operation included in a second application interface representing a second service; mapping, using the one or more computing devices, the first semantic element with the second sematic element; and integrating, using the one or more computing devices, the first application interface with the second service based on the mapping.

Other embodiments of one or more of these aspects include corresponding systems, apparatus, and computer programs, configured to perform the actions of the methods, encoded on computer storage devices.

These and other embodiments may each optionally include one or more of the following features. For instance, the system may further include that the definition module is further configured to receive a first interface control document associated with the first service, to receive a second interface control document associated with a canonical information model of an enterprise service bus, and to store the first interface control document and the second interface control document in the data store; that the data store is a centralized repository; that the second service includes the enterprise service bus; that the first interface control document describes a functionality of the first operation and includes the first semantic element; that the second interface control document describes a functionality of the second operation and includes the second semantic element; that the second operation is an operation supported by the enterprise service bus; that the centralized repository is configured to connect the first semantic element with the second semantic element based on the mapping; that the workflow module is further configured to obtain approval of one or more of the first interface control document, the second interface control document, and the mapping; that to integrate the first application interface with the enterprise service bus is further based on the approval; a visualization module executable by the one or more processors to generate visualization data that graphically illustrates the mapping of the first semantic element with the second semantic element and to provide the visualization data for display to a user; that the definition module is further configured to determine a third semantic element for a third operation included in a third application interface representing a third service, determine a mapping of the third semantic element with the second sematic element, and integrate the third application interface with the second service based on the mapping of the third semantic element with the second sematic element; that the second service includes an enterprise service bus and to integrate the third application interface with the second service integrates the third application interface with the enterprise service bus; a visualization module executable by the one or more processors to generate visualization data that graphically illustrates the mapping between the first semantic element and the third semantic element via the second semantic element and to provide the visualization data for display to a user; that the definition module is further configured to validate the mapping of the first semantic element with the second sematic element; that to validate the mapping of the first sematic element with the second semantic element includes verifying one or more of whether the first semantic element and the second semantic element are compatible, whether a required semantic element of the first application interface or the second application interface has been mapped, and whether a semantic element that has been incorporated by reference is valid; and that the definition module is further configured validate the mapping by determining the mapping to include an error and notifying a stakeholder about the error via an electronic message.

For instance, the operations may further include receiving, using the one or more computing devices, a first interface control document associated with the first service, the first interface control document describing a functionality of the first operation and including the first semantic element; receiving, using the one or more computing devices, a second interface control document associated with a canonical information model of an enterprise service bus, the second service including the enterprise service bus, the second operation being an operation supported by the enterprise service bus, and the second interface control document describing a functionality of the second operation and including the second semantic element; storing, using the one or more computing devices, the first interface control document and the second interface control document in a centralized repository; that the mapping of the first semantic element with the second semantic element includes connecting the first semantic element with the second semantic element in the centralized repository; obtaining, using the one or more computing devices, approval of one or more of the first interface control document, the second interface control document, and the mapping; that the integrating the first application interface with the enterprise service bus is further based on the approval; generating, using the one or more computing devices, visualization data that graphically illustrates the mapping of the first semantic element with the second semantic element; providing, using the one or more computing devices, the visualization data for display to a user; determining, using the one or more computing devices, a third semantic element for a third operation included in a third application interface representing a third service; mapping, using the one or more computing devices, the third semantic element to the second sematic element; integrating, using the one or more computing devices, the third application interface with the second service based on the mapping of the third semantic element with the second sematic element; that the second service includes an enterprise service bus and the integrating of the third application interface with the second service integrates the third application interface with the enterprise service bus; generating, using the one or more computing devices, visualization data that graphically illustrates the mapping between the first semantic element and the third semantic element via the second semantic element; providing, using the one or more computing devices, the visualization data for display to a user; validating, using the one or more computing devices, the mapping of the first semantic element with the second sematic element; that the validating of the mapping of the first sematic element with the second semantic element includes verifying one or more of whether the first semantic element and the second semantic element are compatible, whether a required semantic element of the first application interface or the second application interface has been mapped, and whether a semantic element that has been incorporated by reference is valid; and that the validating of the mapping further includes determining the mapping to include an error and notifying a stakeholder about the error via an electronic message.

For instance, the features may further include that the second service includes one of an enterprise service bus, an extract-transform-load framework, and a gateway; that the first semantic element includes a field associated with an input message of the first operation, and the second semantic element includes a field associated with one of an output message and an error message of the second operation; that the first semantic element includes a field associated with an output message of the first operation, and the second semantic element includes a field associated with one of an input message and an error message of the second operation; and that the first service is a consumer service and the third service is a provider service, and the first operation may request that the second operation call the third operation to provide a resource.

It should be understood that the language used in the present disclosure has been principally selected for readability and instructional purposes, and not to limit the scope of the subject matter disclosed herein.

BRIEF DESCRIPTION OF THE DRAWINGS

The disclosure is illustrated by way of example, and not by way of limitation, in the figures of the accompanying drawings in which like reference numerals are used to refer to similar elements.

DETAILED DESCRIPTION

Figure 1:
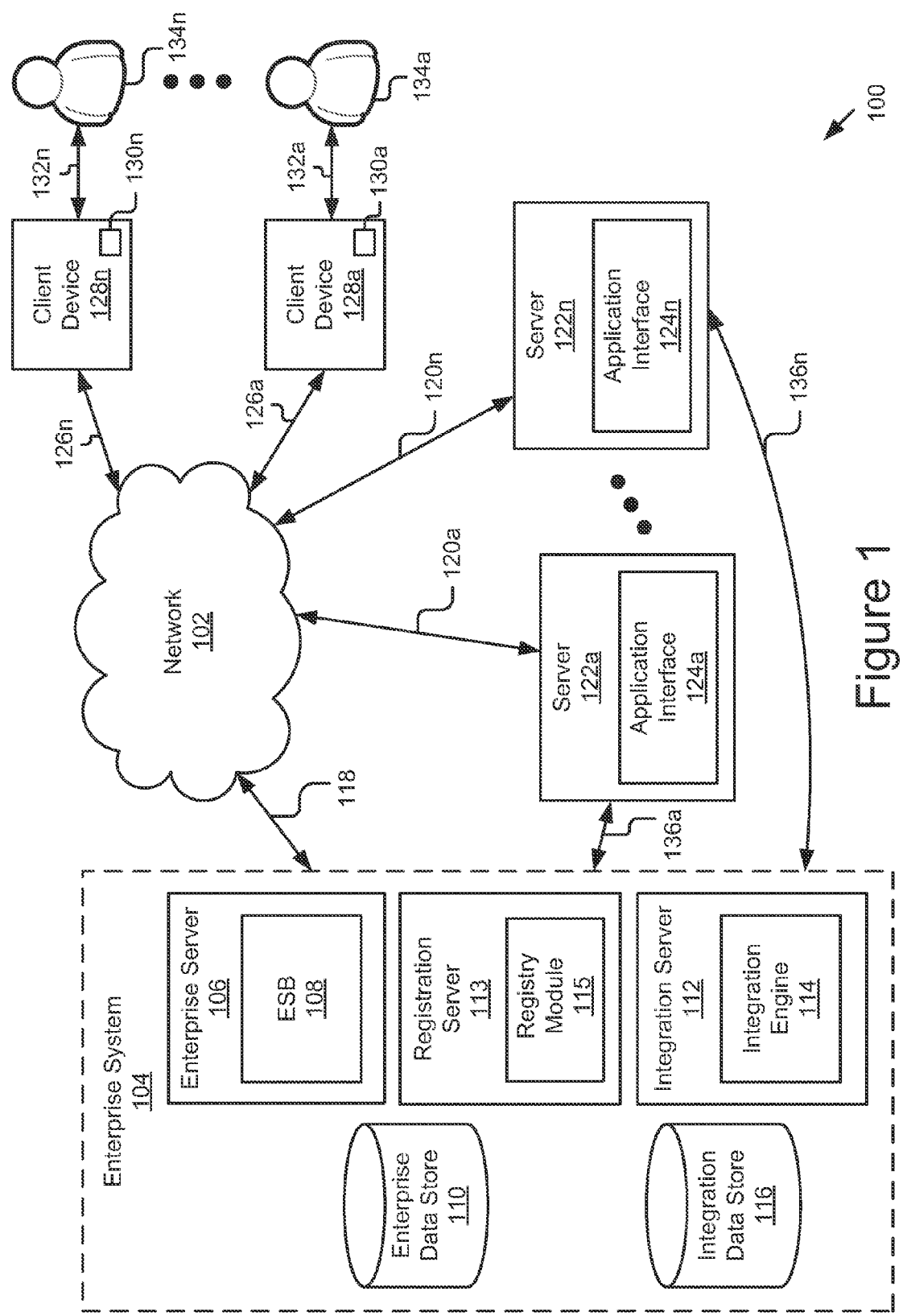
FIG. 1 is a block diagram of an example system for defining and mapping application interface semantics.

The present disclosure describes innovative and novel technology for defining and mapping application interface semantics, integrating application interfaces with an enterprise service bus (ESB) using the interface definitions and mappings, and for visualizing and managing the application integrations. The system 100 depicted in FIG. 1 may, in some embodiments, include an integration repository and workflow system which enables centralized storage of metadata for functional and nonfunctional properties of application interfaces. In various embodiments, the integration repository and workflow system is capable of supporting point-to-point integrations, ESB/enterprise application integrations, ETL (extract, transform, load) integrations, gateway appliance integrations, etc.

In some embodiments, the functional and nonfunctional properties of an application interface (service) are stored as a dataset referred to herein as an interface control document (ICD). The terms ICD and application interface may be referred to interchangeably herein in some instances. The ICD can, in some non-limiting examples, include data describing an application interface's function, content, structure, semantics, security, performance, service level agreements, etc. In some embodiments, the ICD can be created/modified by an author/user 134 via an associated user interface displayed on a client device 128. For example, a user can provide input describing the purpose and scope of the application interface, the operations supported by the application interface, the protocols to be used for connectivity to the ESB 108, etc.

The following is a non-limiting example of the type of information and/or general format that the ICD could include:

| | | |
|---|---|---|
| 0 | ICD HEADER | |
| 0.1 | Service Name: | Name of service provided by application interface. |
| 0.2 | Contributor(s): | All contributors to the document. |
| 0.3 | Creation Date: | Date/time. |
| 0.4 | Last Update: | Date/time. |
| 0.5 | Change Record: | Each change made to the document after the initial proposal including information such as date, author, revision, summary of changes, etc. |
| 0.6 | Version: | Version number. |
| 0.7 | Swimlane: | Swimlane tag. |
| 1 | ICD DETAILS | |
| 1.1 | Document Location: | Electronic location of ICD (e.g., URI, file path, etc.). |
| 1.2 | Reviewer(s): | Name and title of reviewer(s) and date(s) reviewed. |
| 1.3 | Approver(s): | Name and title of approver(s) and date(s) reviewed. |
| 1.4 | Intended Audience: | Description of intended audience (e.g., ICD is intended to be used by architects of ACME services). |
| 1.5 | ICD Overview: | Overview of ICD (e.g., ICD describes service interface that provides order history information for ACME owned orders). |
| 1.6 | References: | Table listing supporting documents (e.g., reference documents, technical specifications, design materials, etc.) including document name, author, location, etc. |
| 2 | Open Issues: | Table listing issues to be closed prior to ICD approval (e.g., issue ID, description of issue, status (open/closed), owner, description of resolution). |
| 3 | INTRODUCTION | |
| 3.1 | Purpose of the interface(s): | Description of interface including intent. |
| 3.2 | Scope of the interface(s): | Description of items addressed/not addressed by interface. |
| 3.3 | Assumptions: | List of pre-condition and environment-related assumptions which the service provider expects to be present in the operating environment. |
| 3.4 | Risks: | Description of any business risks involved with this service. |
| 3.5 | List of functionalities: | List of operations/functionalities provided by this interface (details of each operation are captured in sections 4-4.1.11 below). |
| 3.6 | Service Category: | Service category the ICD applies to (e.g., process services, transaction services, business function services, technical function services, etc.). |
| 3.7 | System context: | Illustration(s) of relationship between ICD party, the ESB, and other dependent services (e.g., see FIG. 3). |
| 3.8 | Service Interdependencies: | Description of 1) services that the service embodied by ICD will consume; and 2) services that will consume the service. |
| 3.8.1 | Sequence Diagrams: | Signal diagram(s) showing sequence of calls used to consume or provide a service (e.g., requests, responses, synchronicity of calls, senders and recipients of calls, etc.). |
| 3.9 | Glossary: | Table of terms and definitions used by/associated with ICD. |
| 4 | FUNCTIONALITY DETAIL | |
| | This section provides detail of each operation supported by the ICD | |
| 4.1 | Operations (1 . . . N): | Operation name. Section (4.1) and its sub-sections repeated for each operation method listed in section 3.5. |
| 4.1.1 | Abstract: | High level description of the functionality offered by the operation. |
| 4.1.2 | Functionality Provided: | Detail description of functionality of this operation. |
| 4.1.3 | Exception Behavior: | Description of exception processing for this operation (e.g., how the business would behave when this operation faces an exception condition). |
| 4.1.4 | Side Effects: | Description of impact and side effects of this operation, if any, on the entire system (e.g., ESB, dependencies, computing resources, storage resources, bandwidth, etc.). |
| 4.1.5 | Recommended Usage: | Description of how to use/not use the interface. |
| 4.1.6 | Invocation type: | Synchronous or Asynchronous. In some cases, for synchronous invocation, the consumer may call the service and wait for the response to come before starting new job. In some cases, for asynchronous invocation, the consumer may call the service and not wait for the response but start its new job as usual. The response may be received through a callback mechanism (the service provider may call back one method of the consumer to send response to it). |
| 4.1.7 | Protocol: | Protocol the consumer or provider will use for ESB connectivity (e.g., HTTP(S), JMS, MQ, File, FTP, SSH, etc.). |
| 4.1.8 | Input Message | |
| 4.1.8.1 | Input Message Structure: | Detailed list of all message fields/elements. Representative fields include, but are not limited to: business name, business description, |

| | | |
|---|---|---|
| | | field name, path, data type, data length, data format, whether field is required/optional/conditional, whether field repeats, default values, allowed values, required values. |
| 4.1.8.2 | Input Message Semantics: | Detailed list of all message fields/elements. Representative fields include, but are not limited to: business name, business description, field name, path, data type, data length, data format, whether field is required/optional/conditional, whether field repeats, default values, allowed values, required values. |
| 4.1.8.3 | Input Message Examples: | Example(s) of message. |
| 4.1.8.4 | Input Message Links: | Electronic link to a document that explicitly declares the message structure (e.g., may be in any format understood by the system such as XSD, WSDL, Cobol, etc.). |
| 4.1.9 | Output Message | |
| 4.1.9.1 | Output Message Structure: | Detailed list of logical segments (e.g., header, detail, trailer, etc.) of the message fit together to form a whole, including, for example: name, description, and properties for each segment. The properties may include the segment size, whether the segment is required, optional, or conditional, and the minimum and maximum number of times the segment may occur. |
| 4.1.9.2 | Output Message Semantics: | Detailed list of all message fields/elements. Representative fields include, but are not limited to: business name, business description, field name, path, data type, data length, data format, whether field is required/optional/conditional, whether field repeats, default values, allowed values, required values. Format may include, but is not limited to tabular, XML, XSD, WSDL, flat file, DBMS, etc., data structures, etc. |
| 4.1.9.3 | Output Message Examples: | Example(s) of message. |
| 4.1.9.4 | Output Message Links: | Electronic link to a document that explicitly declares the message structure (e.g., may be in any format understood by the system such as XSD, WSDL, Cobol, etc.). |
| 4.1.10 | Error Message | |
| 4.1.10.1 | Error Message Hierarchy: | Detailed list of logical segments (e.g., header, detail, trailer, etc.) of the message fit together to form a whole, including, for example: name, description, and properties for each segment. The properties may include the segment size, whether the segment is required, optional, or conditional, and the minimum and maximum number of times the segment may occur. |
| 4.1.10.2 | Error Message Semantics: | Detailed list of all message fields/elements. Representative fields include, but are not limited to: business name, business description, field name, path, data type, data length, data format, whether field is required/optional/conditional, whether field repeats, default values, allowed values, required values. Format may include, but is not limited to tabular, XML, XSD, WSDL, flat file, DBMS, etc., data structures, etc. |
| 4.1.10.3 | Error Message Examples: | Example(s) of message. |
| 4.1.10.4 | Error Message Links: | Electronic link to a document that explicitly declares the message structure (e.g., may be in any format understood by the system such as XSD, WSDL, Cobol, etc.). |
| 4.1.11 | Quality of Service (QoS) Requirements | |
| 4.1.11.1 | Security Requirements | |
| 4.1.11.1.1 | Authentication Requirements: | Authentication requirements, if any. |
| 4.1.11.1.2 | Encryption Requirements: | Encryption type, if needed. |
| 4.1.11.2 | Performance (Response Times): | Service level requirements (e.g., maximum response time (MRT), MRT at normal load, MRT service level agreement, % of time the MRT will be met at normal load (e.g., >99%), average response time (ART), ART at normal load, ART service level agreement, % of time the ART will be met at normal load (e.g., >95%). |
| 4.1.11.3 | Transaction Volume (Throughput): | Expected volumes (e.g., peak day, peak hour, average day, average hour, min/max/average message sizes), such as a table listing transaction volumes for: the days of week where transaction volumes are expected; peak number of transactions per hour (across all consumers/providers); peak number of transactions per day (across all consumers/providers); average number of transactions per hour (across all consumers/providers); average number of transactions per day (across all consumers/providers); Peak transactions per hour based on line of business (e.g., 50K orders per hour, 75K shipments per hour, etc.); peak transactions per day based on line of business (e.g., 120K orders per day, 180K shipment per day, etc.). Values may be based on historical data from service (if available). |
| 4.1.11.4 | Availability: | System availability requirements (e.g., hours per day and days per year). |

| | | |
|---|---|---|
| 4.1.11.5 | Reliability (Mean time between failures): | Value reflecting the ability of a system or component to perform its required functions under stated conditions for a specified period of time. |
| 4.1.11.6 | Timeouts: | Expected behavior in case of time outs (e.g., service request types such as return lookup, return history, return authorization; service response types, etc.). |
| 4.1.11.7 | Deployment Details | Name of software package, electronic file location of package, runtime environment, etc. |

With reference to the above table, the following table includes additional non-limiting examples of the representative fields noted in sections 4.1.8.1, 4.1.8.2, and 4.1.8.3.

| | |
|---|---|
| Business Name & Description: | The business name of the field and its meaning in functional terms. |
| Field Name: | The technical name for a field (e.g., an XML element, column name, attribute, copy book name, etc.). |
| Path: | Reference to associated segment/data (e.g., for an XML message structure, the path may be the XPaths associated with an element or attribute such as /GetOrderHistory/OrderNmb; for a flat file structure, path may reference the appropriate segment such as a header, detail, comment, trailer, etc.). |
| Data Type: | Representative values include, but are not limited to, Character, String, Date, Datetime, Integer, Decimal, Numeric, Binary (available data types may vary from platform to platform). |
| Data Length: | The overall length of the field (e.g., in bytes, using dot notation, etc.) (data length for a type may vary from platform to platform). |
| Data Format: | Format of the data type (e.g., for a date, format may include MMDDYY, MM/DD/YYYY, YYYY-MM-DD, etc.). |
| R/O/C (Required/Optional/Conditional): | Required = always required; Optional = always optional; Conditional = if a field is required or optional depending on message structure or values, then Conditional (conditional requirements may be included in the Field Name/Description column). |
| Repeats: | Indicates whether field repeats (e.g., number = number of allowable repeats, Y = unbounded repeats; blank or N = no repeat). |
| Default Values: | If a default value is required for the field, specify value. |
| Allowed Values: | If the field has a restricted list of codes or values, list them here (e.g., code value and name). |
| Required Values: | If the field has a required and validated list of codes or values, list them here (e.g., code value and name). |
| Format: | Format may include, but is not limited to tabular, XML, XSD, WSDL, flat file, DBMS, etc., data structures, etc. |

Figure 3:
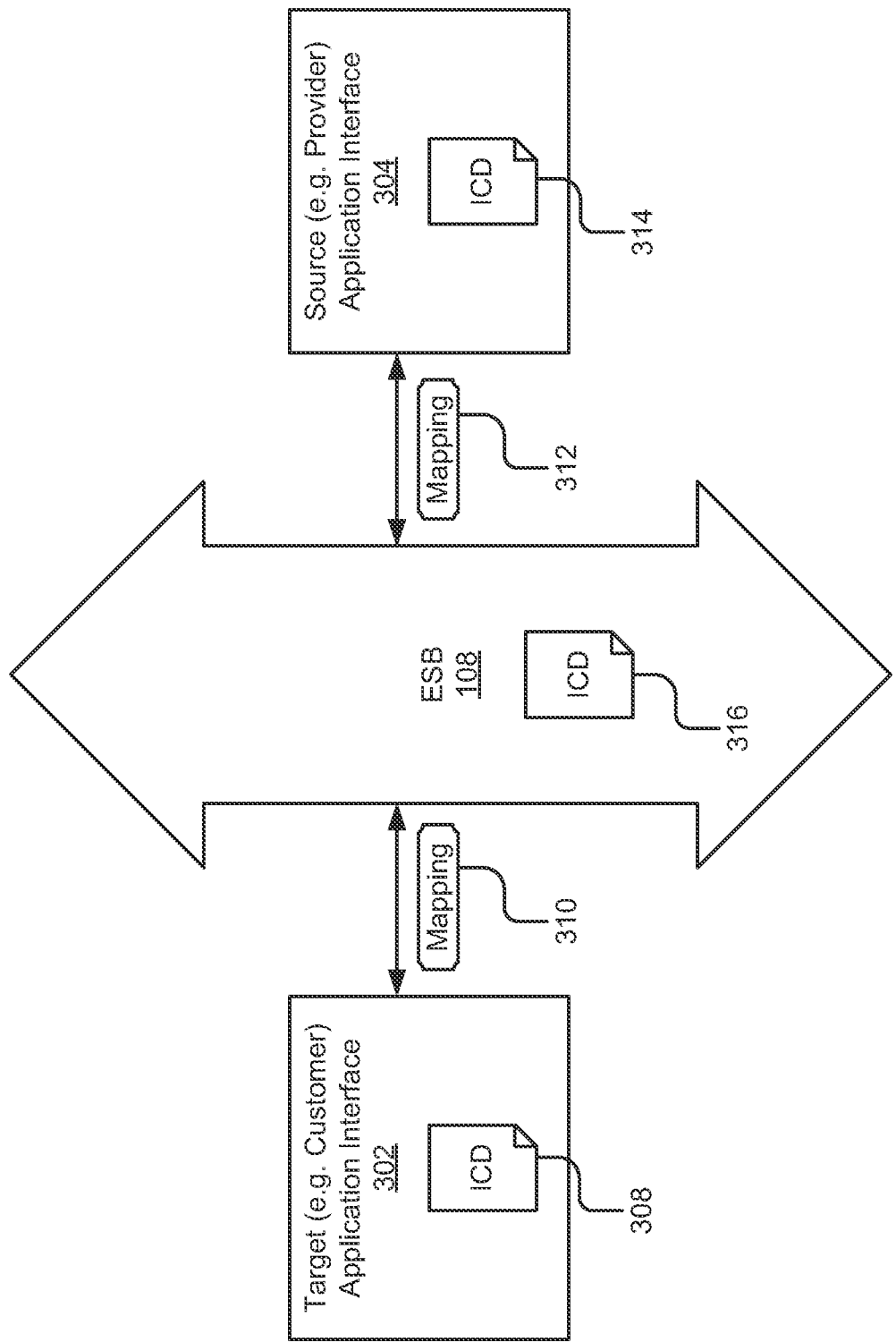
FIG. 3 is a block diagram of an example integration of an example target application interface and an example source application interface with an example enterprise service bus.

Via mappings, the system can allow users to create and maintain transformation rules for data that flows between application interfaces via the ESB 108. As depicted in FIG. 3, and discussed in further detail below, multiple mappings may be used to conveniently integrate various entities of the system 100 via the ESB 108. In addition to its plain and ordinary meaning, a mapping includes one or more rules that map the elements of one ICD to another ICD. In some embodiments, a mapping may link the message semantics defined by the ICD of an application interface to a canonical information model of the ESB 108, or vice versa.

For example, for a given operation included in an ICD of a consumer service, a mapping may include rule(s) that map an output message semantic of that operation to a corresponding input message semantic of the ESB ICD. Continuing this example, a second mapping may map the input message semantic of the ESB ICD to a corresponding input message semantic and operation of an ICD a provider service, thereby linking the operations of the consumer service and the provider service.

By way of further example and not limitation, a mapping may include references to a target service/ICD and a source service/ICD and one or more transformation rules that map operation field(s) included in the source ICD to corresponding operation field(s) included in the target ICD, including, for example, corresponding input, output, and error message semantics. A transformation rule may indicate the fields (e.g., semantic elements) being mapped. Additionally, the transformation rule may include electronic pointers (e.g., XPaths) to the fields being mapped, formatting requirements of the fields being mapped, comments for the fields being mapped, version information for the mapping and fields, swimlane information for the mapping, the status of the mapping, the change record, reviewers, approvers, contributors, creation date, date of last update, document location, dependencies, references, open issues, etc.

A source ICD included in a mapping may reflect the application interface/service of a first entity (e.g., consumer, provider, subscriber, publisher, ESB, etc.) and the target ICD may reflect the application service/interface of a compatible second entity (e.g., consumer, provider, subscriber, publisher, ESB, etc.). In addition to its plain and ordinary meaning, a service includes a computer-based service provided to customers over a network. While the services described herein relate to enterprise-level services, it should be understood that this disclosure is applicable to other types of services including specialized services, consumer services, local services, a combination of the foregoing, etc.

In some cases, an ICD of a consumer, provider, subscriber, publisher, etc., may define an element not included in the canonical information model of the ESB 108. If such gaps exist, the technology can automatically enhance the canonical information model to support the new information. The technology also supports branching (e.g., versioning, dividing by swimlane, etc.) of both ICDs and mappings, as discussed further elsewhere herein.

The integration data store 116 may include a centralized graph-based data store which provides query and browse capabilities and enables users to ask and answer questions about the web of related systems that are enabled by the centralized data store and the overall architecture of the system 100 (see FIG. 1). In some embodiments, integration data store 116 stores the ICDs and mappings in an interconnected, graph-based format that is dynamically scalable and can easily be queried by any dimension, including, for example, by integrations, ICDs, mappings, semantics, etc. One benefit of storing the ICDs and mappings in this way is that the effect of any changes to an ICD or mapping on other related ICDs and/or mappings may immediately be analyzed and determined, even down to the lowest level (e.g., semantic level). For example, if a specific semantic element of an ICD is changed, an impact analysis can be run to determine the impact on other mappings, ICDs, and applications that directly or indirectly rely on that field.

The ICDs and mappings, as described herein, provide a number of benefits including, for example, clarifying fundamental requirements of an application interface prior to its integration with the ESB 108; speeding the testing cycle for integrating the application interface; shortening quality assurance testing cycles; reducing quality problems in the integration and quality assurance testing cycles; and generating a standard library of ICDs that can be reused and/or modified for reuse in future integrations.

An example system 100 for integrating application interfaces with an ESB 108 is depicted in FIG. 1. As depicted, the system 100 may include an enterprise system 104, servers 122a . . . 122n (also referred to herein individually and collectively as 122), and client devices 128a . . . 128n (also referred to herein individually and collectively as 128), which are accessible by users 134a . . . 134n (also referred to herein individually and collectively as 134) as illustrated by lines 132a . . . 132n. These entities may be communicatively coupled via a network 102. For instance, the enterprise system 104 may be coupled to the network 102 as illustrated by signal line 118, the servers 122a . . . 122n may be coupled to the network 102 as illustrated by signal lines 120a . . . 120n, and the client devices 128a . . . 128n may be coupled to the network 102 as illustrated by signal lines 126a . . . 126n. The servers 122a . . . 122n may also be directly coupled to the enterprise system 104 as illustrated by signal lines 136a . . . 136n. While only one network 102 is depicted as coupling the entities of the system 100 (e.g., enterprise system 104, the servers 122a . . . 122n, and the client devices 128a . . . 128n), in practice any number of networks or network combinations can connect these entities.

The network 102 may include one or more wired or wireless networks having any number of network configurations, including, for example, a star configuration, token ring configuration, or other known configurations. The network 102 may include any interconnected data path across which multiple devices may communicate including, for example, a local area network (LAN), a wide area network (WAN) (e.g., the Internet), a wireless wide area network (WWAN), a virtual private network (VPN), various telecommunications networks, direct data connections, etc. In some embodiments, the network 102 may include device-to-device communication networks (e.g., Bluetooth®), peer-to-peer (P2P) networks, etc., for sending and receiving data between devices. The network 102 may transmit data using a variety of different communication protocols including, for example, user datagram protocols (UDP), transmission control protocols (TCP), hypertext transfer protocol (HTTP), hypertext transfer protocol secure (HTTPS), file transfer protocol (FTP), various cellular protocols, various email protocols, etc. Computing devices (e.g., 106, 112, 113, 122, 128, etc.) may couple to and communicate via the network 102 using wireless and/or wired connections.

The enterprise system 104 may include one or more computing devices and data storage devices and may provide various enterprise services to other entities coupled to the network 102, including, for example the servers 122a . . . 122n and client devices 128a . . . 128n, although the enterprise system 104 may have different configurations and include different components. As depicted, the enterprise system 104 includes an enterprise server 106, an integration server 112, a registration server 113, an enterprise data store 110, and an integration data store 116, which are coupled for electronic communication with one another (e.g., via direct data connections, computer network(s) (e.g., the network 102), a combination thereof, etc.). Additionally, each component of the enterprise system 104 may be coupled to the network 102 (e.g., as illustrated by the signal line 118) for cooperation and communication with one another and the other entities of the system 100.

The enterprise server 106, the integration server 112, and/or the registration server 113 may each include one or more physical and/or virtual computing devices, such as a hardware server, a virtual server, a server array, and/or any other computing device, or group of computing devices, having data processing, storing, and communication capabilities. In some embodiments, some or all aspects of the enterprise system 104 may be virtualized (e.g., using a virtual machine implemented via software) and/or implemented via a cloud-based architecture with computing and storage systems that are dynamically scalable and distributed across the network 102. Although only one enterprise server 106, integration server 112, and registration server 113 are shown, multiple servers 106, 112, and 113 may be included. Moreover, it should be understood that the enterprise system 104 may be made up of any combination of computing devices or a single computing device.

The enterprise server 106 may host the ESB 108, which, as discussed further elsewhere herein, facilitates interaction between various applications that have been integrated with the ESB 108. For instance, a consumer service can connect to a provider service that is integrated with via the ESB 108 to retrieve information about various products and services offered by the provider service (e.g., see description of FIG. 3 below). The enterprise data store 110 and the integration data store 116 are information sources for storing data and providing access to stored data. In some embodiments, the enterprise data store 110 and the integration data store 116 may be included in one or more of the enterprise server 106, the integration server 112, and the registration server 113. In other embodiments, the enterprise data store 110 and/or the integration data store 116 may be included in a server or storage system distinct from but accessible by the enterprise server 106, the integration server 112, and/or the registration server 113. It should be understood that further configurations are also contemplated in within the scope of the present disclosure.

The registration server 113 may include a registry module 115, which includes software instructions executable by one or more processors of the registration server 113 to provide a service registry for the services integrated with the ESB 108. Registration information may be access, stored, and maintained by the registry module 115 in a data store, such as the enterprise data store 110. In some embodiments, the registry module 115 may determine information about the services registered with the ESB 108 including status of the integration, ownership information for the services, information from mappings and ICDs associated with the service, service requirements, etc., and provide that information to other entities including services providers, consumers, etc., seeking to utilize resources offered by the service. The registry module 115 may access the above-noted information from the integration data store 116 and/or the enterprise data store 110.

The integration server 112 may include an integration engine 114 for integrating application interfaces with the ESB 108. In particular, by way of example and not limitation, the integration engine may provide for the definition of ICDs for application interfaces and the mapping of ICD semantics with the ESB 108, manage approval for integrating application interfaces with the ESB 108, generate and provide visualizations of the ICDs and mappings, etc., as discussed elsewhere herein. Additional structure and functionality of the integration server 112 and integration engine 114 are discussed in further detail below with reference to at least FIGS. 2-15.

The enterprise data store 110 and/or the integration data store 116 may include a database management system (DBMS) executable by a processor to manage a collection of records, files, and objects including the media objects. In some embodiments, the integration data store 116 may store the integration-related data including ICD data, mapping data, workflow data, review data, approval data, etc. In some embodiments, the integration data store 116 may include an RDF data store for storing data in resource description format (RDF) and/or web ontology language (OWL). For example, the ICDs and mappings may be stored in the RDF data store as RDF and/or OWL documents. In some embodiments, the properties included in an ICD may be represented in the form of subject-predicate-object expressions and easily linked to other ICDs with which it is connected and/or dependent upon. Use of this RDF data store is advantageous as it allows the ICDs and mappings to be stored in a graph-based format that is easily understandable and efficiently searchable to yield the parameters and dependencies of a given integration and is dynamically scalable to support large number of applications (e.g., 1,000-1,000,000 or more) that may be integrated with the ESB 108. In these embodiments, the data stored in the RDF data store may be manipulated (inserted, selected, updated, deleted, etc.) using programmatic operations (e.g., SPARQL Protocol and RDF Query Language (SPARQL)).

In some embodiments, the enterprise data store 110 and/or the integration data store 116 may also include a structured query language (SQL) DBMS for storing data in multi-dimensional tables having rows and columns, and manipulate, i.e., insert, query, update and/or delete, rows of data using programmatic operations (e.g., SQL). The enterprise data store 110 may store data for operating and managing the ESB 108, such as registry data, security data, authentication data, configuration data, server data (e.g., logs), performance data, transaction data, etc.

The client devices 128*a* . . . 128*n* are computing devices having data processing and data communication capabilities. Example client devices 128 may include, but are not limited to, a desktop, laptop, server appliance, set-top box, mobile phone, tablet, other wireless handheld computing device, server, workstation, etc. While FIG. 1 illustrates a system 100 including two or more client devices 128, the present disclosure applies to any system architecture having any number of client devices 128. Additional structure and functionality of an example client device 128 is discussed below with reference to at least FIG. 13.

Figure 2:
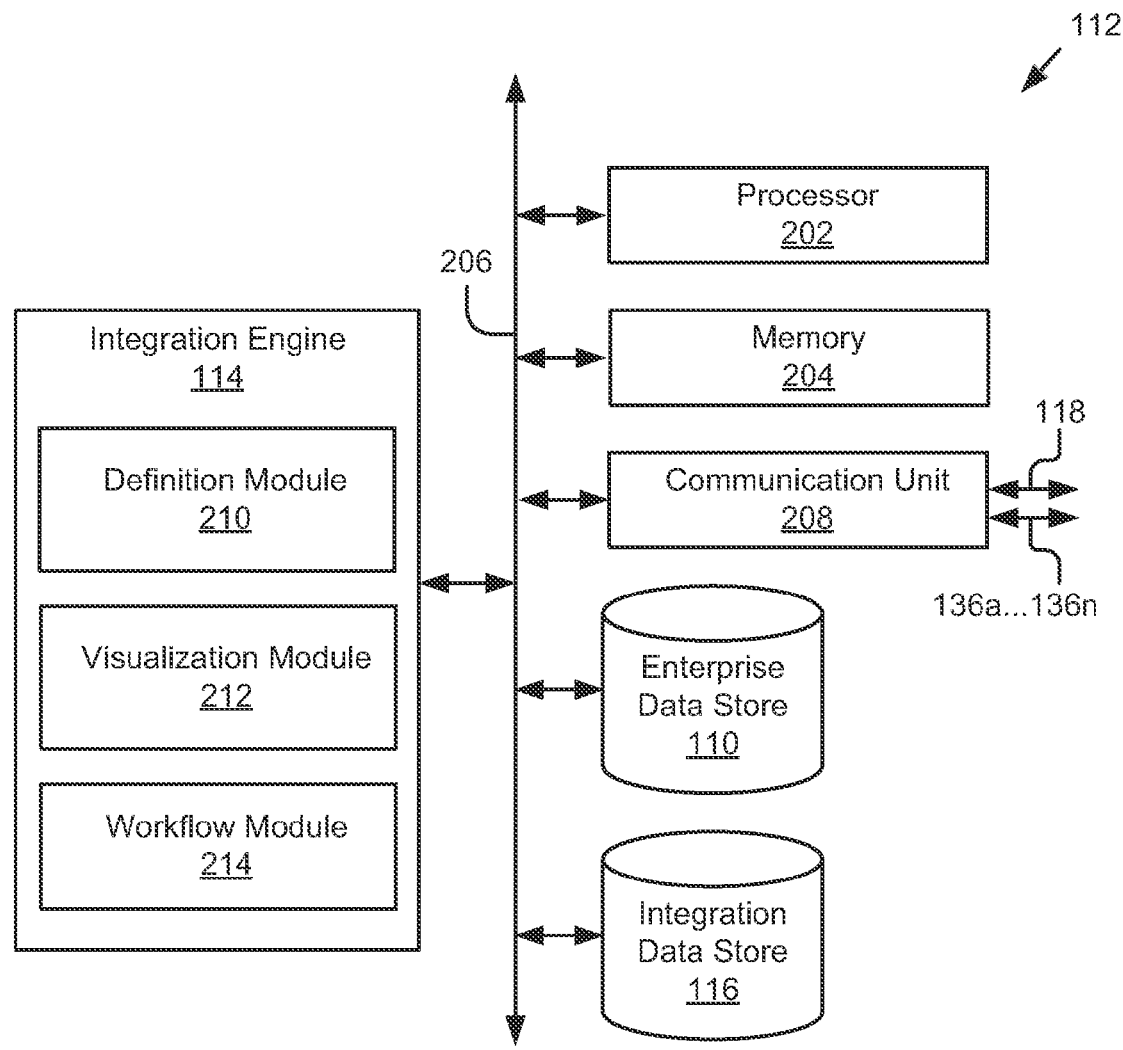
FIG. 2 is a block diagram of an example integration server.

FIG. 2 is a block diagram of an example integration server 112. In the depicted embodiment, the integration server 112 includes a processor 202, a memory 204, and a communication unit 208, which are coupled via a communication bus 206. The communication bus 206 may include any type of conventional communication bus for transferring data between components of a computing device, or between computing devices. The integration server 112 may also include an integration engine 114 and may be coupled to the enterprise data store 110 and the integration data store 116 to access and store data. In some embodiments, the enterprise data store 110 and integration data store 116 may be coupled to and directly accessible via the bus 206. In other embodiments, the integration server 112 may access the enterprise data store 110 and integration data store 116 via the communication unit 208.

The integration server 112 depicted in FIG. 2 is provided by way of example and it should be understood that the integration server 112 may take other forms and include additional or fewer components without departing from the scope of the present disclosure. For example, while not shown, in some embodiments, the integration server 112 may include additional and/or alternative components, such as input and output devices (e.g., a computer display, a keyboard and mouse, etc.).

The processor 202 includes an arithmetic logic unit, a microprocessor, a general purpose controller, or some other processor array to perform computations and provide electronic display signals to a display device (not shown). The processor 202 may be coupled to the bus 206 for communication with the other components of the integration server 112. The processor 202 may process data signals and may have various computing architectures including a complex instruction set computer (CISC) architecture, a reduced instruction set computer (RISC) architecture, or an architecture implementing a combination of instruction sets. Although only a single block for the processor 202 is shown in FIG. 2, the processor 202 may include one or more and/or processing cores. The processor 202 may be capable of supporting the display of images and the capture and transmission of images, perform complex tasks, including various types of feature extraction and sampling, etc. It should be understood that the integration server 112 may include various operating systems, sensors, displays, additional processors, and other physical configurations.

The memory 204 stores instructions and/or data including, for example, the integration engine 114, which may be executed by the processor 202. The instructions and/or data may comprise code for performing any and/or all of the techniques described herein. The memory 204 includes a non-transitory computer-usable (e.g., readable, writeable, etc.) medium capable of containing, storing, communicating, propagating or transporting instructions, data, computer programs, software, code, routines, etc., for processing by or in connection with the processor 202. In some embodiments, the memory 204 may include volatile memory, non-volatile memory, or both. For example, the memory 204 may include a dynamic random access memory (DRAM) device, a static random access memory (SRAM) device, flash memory, a hard disk drive, a floppy disk drive, an optical storage device (e.g., DVD, CD, Blu-ray, etc.), a flash memory device, etc. It should be understood that the memory 204 may be a single device or may include multiple types of devices and configurations. The memory 204 may be coupled to the bus 206 for communication with the processor 202 and the other components of integration server 112.

The communication unit 208 may include one or more interface devices (I/F) for wired and wireless connectivity with the network 102 and the other components of the system 100. For instance, the communication unit 208 may include, but is not limited to, CAT-type interfaces; wireless transceivers for sending and receiving signals using Wi-Fi™; Bluetooth®, cellular communications, etc.; physical interfaces (e.g., USB); various combinations thereof; etc. As depicted in FIGS. 1 and 2, the communication unit 208 may be coupled to the network 102 via the signal line 118, coupled to the servers 122a . . . 122n via signal lines 136a . . . 136n, and coupled to the enterprise and integration data stores 110 and 116 via the bus 206, the network 102, or some other data path. In some embodiments, the communication unit 208 can link the processor 202 to the network 102, which may in turn be coupled to other processing systems. The communication unit 208 can provide other connections to the network 102 and to other entities of the system 100 using various standard communication protocols, including, for example, those discussed elsewhere herein.

As depicted in FIGS. 1 and 2, the integration server 112 may include an integration engine 114 for providing the system integration functionality described herein. The integration engine 114 may include, among other modules, a definition module 210, a visualization module 212, and a workflow module 214. In various embodiments, integration engine 114 and its sub-components 210, 212, and 214 may be sets of instructions stored in the memory 204 and executable by the processor 202 for communication with the other components of the integration server 112; may be implemented via one or more application specific integrated circuits (ASICs) coupled to the bus 206 for cooperation and communication with the other components of the integration server 112; sets of instructions stored in one or more discrete memory devices (e.g., a PROM, FPROM, ROM) that are coupled to the bus 206 for cooperation and communication with the other components of the integration server 112; a combination thereof; etc.

In some embodiments, the integration engine 114, the definition module 210, the visualization module 212, and/or the workflow module 214 are sets of instructions executable by the processor 202 to provide their functionality, and/or are stored in the memory 204 of the integration server 112 and are accessible and executable by the processor 202 to provide their functionality. In these embodiments, the integration engine 114, the definition module 210, the visualization module 212, and/or the workflow module 214 may be adapted for cooperation and communication with the processor 202 and other components of the integration server 112.

In some embodiments, the definition module 210, the visualization module 212, and/or the workflow module 214 are coupled to the integration data store 116 and/or the enterprise data store 110 to manipulate (e.g., store, update, retrieve, delete, etc.) data storable therein. The integration engine 114, the definition module 210, the visualization module 212, and/or the workflow module 214 may also be coupled may also be coupled to one another to send and receive data.

The definition module 210 includes software, code, logic, and/or routines for working with (e.g., composing, modifying, validating, comparing, etc.) ICDs and mappings. The definition module 210 may be coupled to the integration data store 116 to manipulate (e.g., retrieve, update, store, delete, etc.) ICDs and mappings, validation data, and other data stored by the integration data store 116. In various embodiments, the definition module 210 may receive ICD or mapping definition data from another information source, such as client application 130 operating on a client device 128, and then format and/or store the ICD or mapping definition data in the integration data store 116 as an ICD or mapping. In some embodiments, the definition data (ICD, mapping, etc.) may be received responsive to a user inputting the ICD or mapping elements information into a form presented by the client application 130 to the user. For instance, a user may input ICD or mapping-related information, or may import ICD or mapping related information from another information source, such as a local or remote file repository, and then send that information to the definition module 210 via the network 102 for processing and/or storage in the integration data store 116. Non-limiting examples of the various ways ICDs and mappings may be processed by definition module 210 in cooperation with the other elements of the system 100, such as the client application 130, are discussed in further detail below with reference to at least FIGS. 9A-13.

In some embodiments, the definition module 210 can validate the ICDs and mappings that have been or are being defined by the user. For instance, the client application 130 may send the ICD and/or mapping information being input by a user that is composing and/or editing the ICD or mapping to the definition module 210, which may analyze the information for errors, irregularities, impacts, etc., and then inform the user of the issues by generating and sending a notification to the user (e.g., via the client application 130 or another messaging system (e.g., email)). In another instance, the definition module 210 may automatically analyze ICD and mapping for issues at regular intervals or in response to receiving a trigger event, such as the receipt of a visualization, review, or approval request from a stakeholder of the ICD or mapping.

In some embodiments, during the validation process, the definition module 210 may validate an entire chain of ICDs and mappings (associated with one or more integrations) (or portions thereof), including any ICDs or mappings that are incorporated by reference, to identify any issues that may have been replicated throughout the chain. In some embodiments, any issues identified may be illustrated (e.g., using coloring or highlighting) in the impact/visualization views depicted by the user interfaces shown in FIGS. 14 and 15. In other embodiments, the definition module 210 may analyze mapping information as it is being defined by a user via the mapper 1322 (see FIG. 13) and can send validation information to the mapper 1322 so the user receives real-time feedback of any ICD fields that may have been incorrectly or incompletely mapped.

In some embodiments, the definition module 210 may cooperate with the visualization module 212 and/or workflow module 214 to validate one or more ICDs or mappings. In other embodiments, the visualization module 212 or the workflow module 214 may include the validation functionality of the definition module 210 and may validate any ICDs or mappings itself.

In some cases, a user may wish to visualize the effects a mapping is having on the integration and may switch from a mapping view to a visualization view (e.g., see FIGS. 14 and 15) that shows the impacts of the elements that have been mapped, which elements have not yet been mapped, which elements have been incorporated by reference, whether any issues exist that need to be resolved (e.g., errors, incompatibilities, etc.).

The visualization module 212 includes software, code, logic, and/or routines for generating visualization data that graphically illustrates the relationships and/or shows the impacts of changes between the various ICDs and mappings associated with an integration and for providing the visualization data for presentation to the user. The visualization data may illustrate an overview of the chain of ICDs and mappings associated with an integration, may illustrate a detailed view of the same, may illustrate how changes may affect certain aspects of the integration (e.g., mapped fields, functionality, etc.), may illustrate a detailed view of how certain items are interrelated, such as certain operations, sematic elements, etc. For instance, if an integration requires a consumer service be mapped to a provider service via the ESB 108, the visualization data may illustrate the mapping of the consumer service to the ESB 108 as well as the mapping of the ESB 108 to the provider service so the user may visualize the details of the integration. In another example, for an existing integration, the visualization data may show how a proposed revision (e.g., to an ICD, mapping, etc.) may affect other aspects of the integration, such as dependent semantic elements, mappings of those elements, etc.

Figure 15:
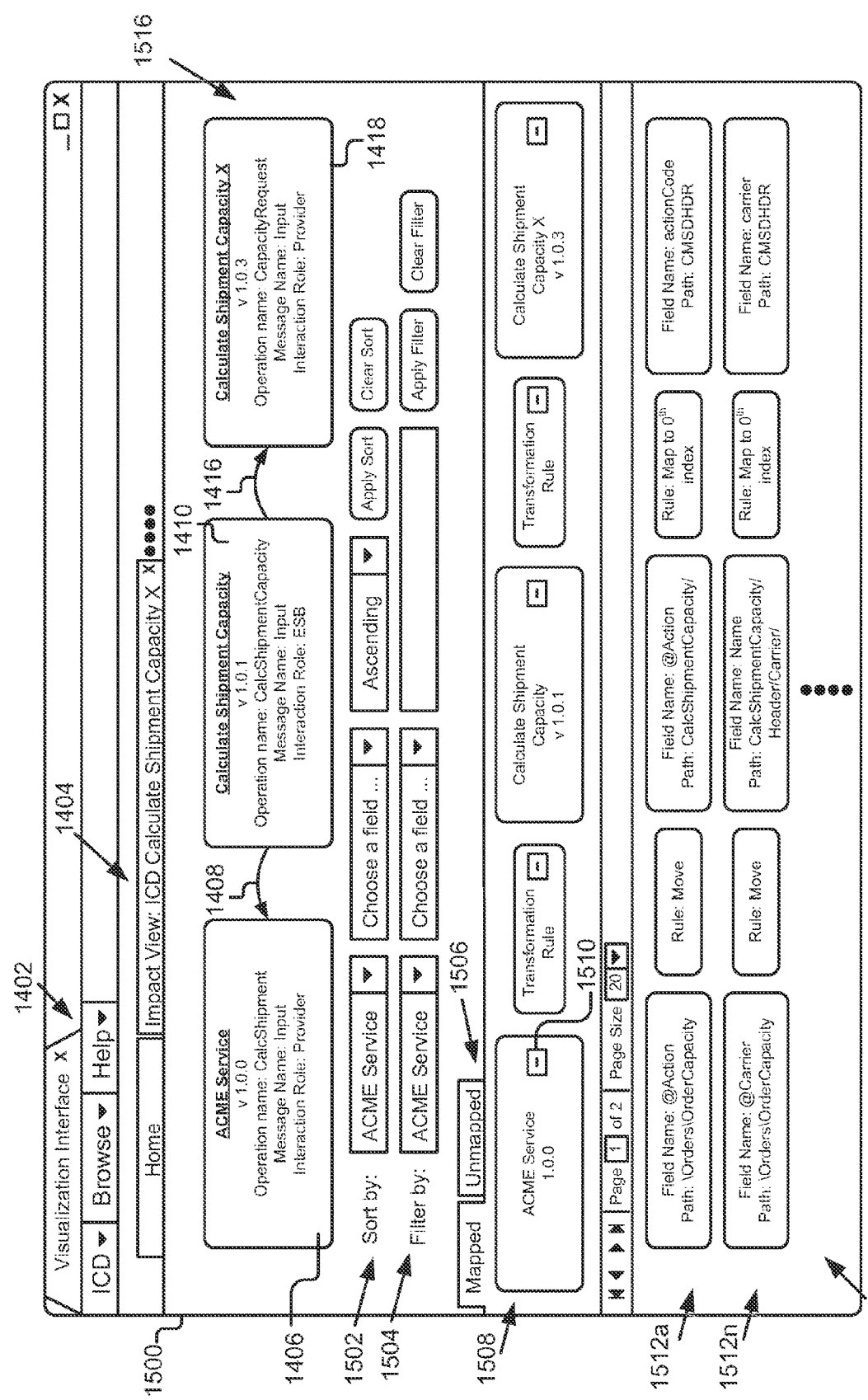
FIG. 15 is a graphic representation of an example user interface for visualizing semantic mappings associated with the example integration.

The visualization module 212 may generate visualization data that provides any desired level of granularity. For example, as shown in FIG. 15, the visualization data may show how the specific fields of each operation are mapped to one another, the specific transformation rules used to map the fields, the formatting required, which fields are incorporated by reference and where they are incorporated from, the electronic locations (e.g., XPaths) of the various fields, impacts of proposed changes to the fields and/or mappings thereof, etc.

The visualization module 212 may send the visualization data via the network 102 to the client application 130 for presentation to the user. In some embodiments, the interface module 1320 may receive the visualization data and render it for display to the user, and the user may provide input to adjust the level of granularity that is being shown, dictate which elements show be expanded or hidden, and/or otherwise customize the viewport to show only the information that is pertinent to the user. In some embodiments, the visualization module 212 may be coupled to the integration data store to store the visualization data it generates. In other embodiments the visualization data may generate and provide the visualization data directly to the client application 130 for presentation.

In some embodiments, the visualization module 212 may cooperate with the definition module 210 to perform a validation and/or impact analysis for changes being proposed for existing ICDs and/or mappings or included in new versions and/or swimlanes of an ICD and/or mapping. This validation and/or impact analysis may be narrowed to a specific ICD and/or mapping or may extend to any ICD and/or mapping that map associated in some way (via an integration, incorporation by reference, etc.). Using the validation and/or impact analysis data, the visualization module 212 may visually annotate (e.g., highlight) any elements that may be affected by the changes. In other embodiments, the visualization module 212 may perform the validation and/or impact analysis itself or cooperation with another element included in the integration engine 114 and/or the client application 130 which is dedicated to perform this functionality.

The workflow module 214 includes software, code, logic, and/or routines for integrating application interfaces with the ESB 108 based on the ICDs and mappings associated with those interfaces. In some embodiments, the workflow module 214 is configured to manage the workflow for drafting, publishing, reviewing, and obtaining approval for ICDs and mappings, such that the application interfaces can be integrated, versioned, etc. The workflow module 214 may be coupled to the other components of the enterprise system 104, such as the integration data store 116, the definition module 210, and/or the visualization module 212, to send and receive data, such as data related to ICDs, mappings, and workflows, etc. In some instances, the workflow module 214 can, in cooperation with the definition module 210, enable the management of the lifecycle of the ICDs and mappings.

In some embodiments, the workflow module 214 is configured to facilitate the review of and obtain approval for new, revised, and/or swimlaned ICDs and mappings associated with the integration of an application interface. For instance, the workflow module 214 may provide ICDs and mappings that are pending review or approval to the relevant stakeholders, and in response, may receive data indicating whether they have be successfully reviewed or approved. The workflow module 214 may store this review data and/or approval data in the integration data store 116 so it can track the status of the ICDs and mappings as well as the overall progress of the integration, and ultimately determine, based on the review and/or approval data, whether to integrate and/or update the integration of the application interfaces with the ESB 108. In addition, the workflow module 214 may be coupled to the enterprise data store 110 to access and/or manipulate data associated with the ESB 108, such as ESB integration requirements and specifications, as well as information associated with the registry module 115 for registering the application interfaces/services that have been approved for integration with the ESB 108, etc. Additional structure and functionality of the workflow module 214 is discussed below with reference to at least FIGS. 6-8.

FIG. 3 is a block diagram of an example integration of source and target application interfaces 302 and 304 with an example ESB 108. In the depicted embodiment, the target application interface 302 is integrated with the ESB 108 based on an ICD 308 which sets forth the properties of the target application interface 302. The mapping 310 maps the properties of the target application interface 302 with the canonical information model and/or ICD 316 of the ESB 108. The source application interface 304 is also integrated with the ESB 108 based on an ICD 314 which sets forth the properties of the source application interface 304. The mapping 312 maps the properties of the source application interface 304 with the canonical information model and/or ICD 316 of the ESB 108. Using the mappings, the source application interface 304 and the target application interface 302 can advantageously interact via the ESB 108. For example, the target application interface 302 can generate and send a request via the ESB 108 to a resource/operation provided by the source application interface 304.

Figure 4:
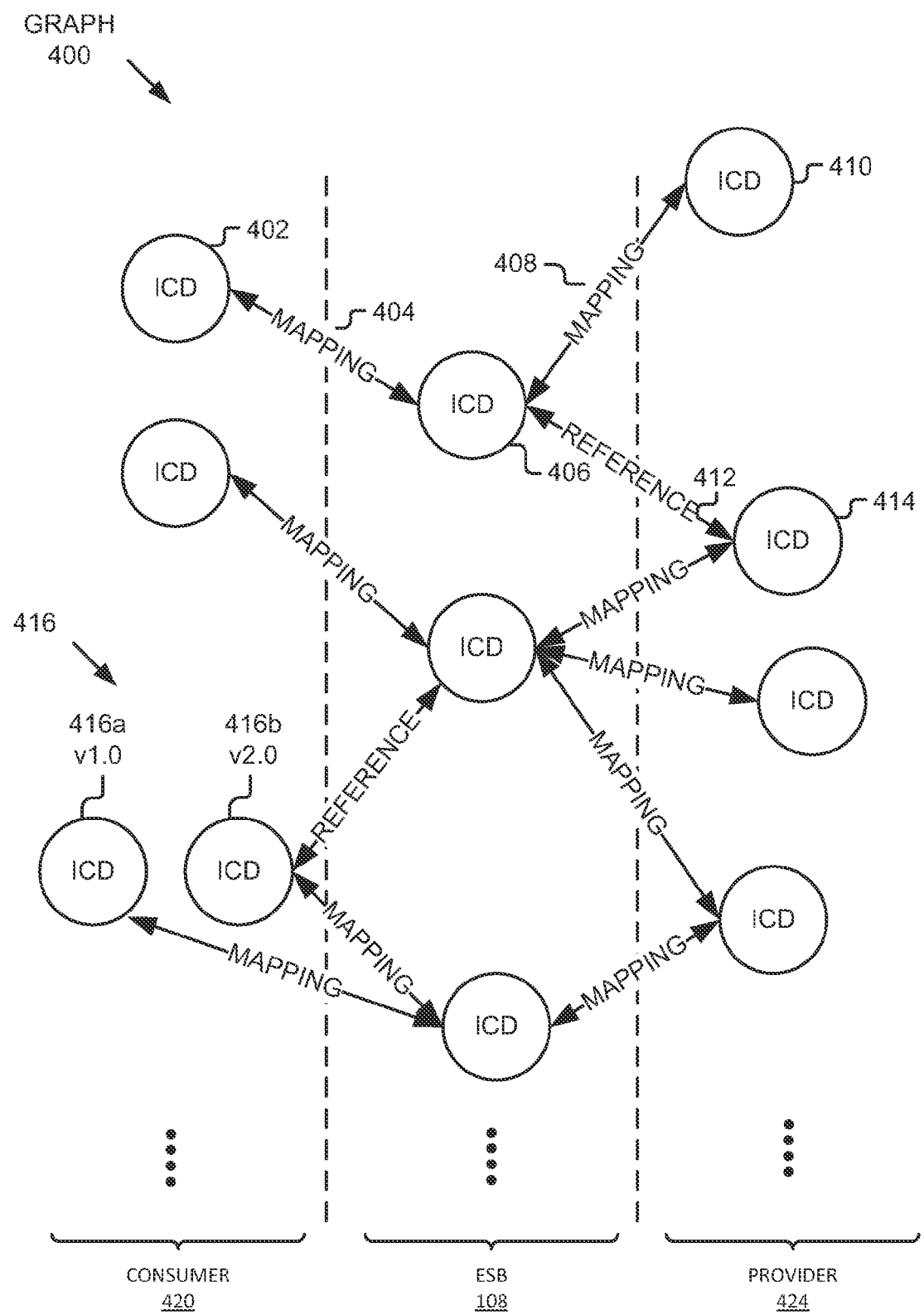
FIG. 4 is a graph illustrating connections between example consumer application interfaces, example provider application interfaces, and an example enterprise service bus.

FIG. 4 is a graph 400 that illustrates connections between example consumer application interfaces 420, example provider application interfaces 424, and an example ESB 108. The consumer application interfaces 420 are represented in FIG. 4 by corresponding ICDs, such as ICD 402. Similarly, the provider application interfaces 424 are represented in FIG. 4 by corresponding ICDs, such as ICDs 410 and 414. The ICDs of the ESB 108, such as ICD 406, represent proxy interfaces supported by the ESB 108, which may be configured to interact with consumer and provider application interfaces to which they are mapped. The proxy interfaces may act as intermediary interfaces for relaying requests from customer application interfaces to provider application interfaces, and vice versa.

By way of further illustration, as depicted in FIG. 4, the ESB ICD 406 is mapped via the mapping 404 to the ICD 402, which represents a consumer service, and mapped via the mapping 408 to ICD 410, which represents a provider service. The mappings 404 and 408 map various elements (e.g., semantics of various operations) of the ICDs 402, 406, and 410 to one another so the consumer and provider services can interact via the ESB 108. For instance, the mapping 404 may map one or more fields of a first operation included in the ICD 402 to corresponding field(s) of a second operation included in the ICD 406 and the mapping 408 may map the field(s) of the second operation included in the ICD 406 to corresponding field(s) of a third operation included in ICD 410. By way of further example, the mappings 404 and 408 may include rules for translating the fields of the respective ICDs 402, 406, and 410 so they can be properly interpreted and the first and third operations can interact.

The ICDs may also be connected via references. For instance, in FIG. 4 ICD 404 is connected via the reference 412 to the ICD 414, which reflects a dependency between the ICDs 406 and 414, such as an incorporation by ICD 414 of elements from ICD 406. By way of further example, the ICD 414 may include a reference to one or more semantics of the ICD 406, such as fields of one or more operations included in ICD 406. Stated another way, instead of having to redefine the semantics for a given operation, the ICD 414 may use the operation/semantics from another ICD, such as ICD 406, by referencing them. For simplicity, an ICD that references information from another ICD is referred to herein as the referencer ICD and the ICD that is being referenced is referred to herein as the referencee ICD. In some instances, the referencer ICD may include an identifier for the referencee ICD, as well as the referenced elements (e.g., by importing/copying them from the referencee ICD), an electronic pointer to the location of the referenced elements in the referencee ICD, etc.

In some instances, the graph 400 may include ICDs that have been versioned or swimlaned. For example, as depicted in FIG. 4, ICD 416 may include multiple versions, such as version 1.0 (labeled 416a) and version 2.0 (labeled 416b). In this example, ICD 416b may represent a development version of an application interface while ICD 416a may represent a production version of the application interface, and once ICD 416b has been reviewed and approved, it may be released to production and replace ICD 416a as the production version (e.g., by updating an ESB control table stored in the enterprise data store 110). While not depicted, an ICD may also be branched into multiple development lanes (referred to herein as swimlanes) so different development groups may simultaneously develop the same version of an ICD without interfering with one another's changes. Eventually, the different ICD swimlanes may be merged back together to form a single ICD. The graph 400 may be embodied by the integration data store 116, which may act as a centralized repository and be configured to store the ICDs and their connections to one another (mappings, references, versions, swimlanes, etc.).

While FIG. 4 is shown as including a particular number of ICDs/interfaces, it should be understood that this embodiment is provided by way of example and that any number of application interfaces, whether they consumer, ESB, provider interfaces or otherwise, may be supported by the enterprise system 104.

Figure 5A:
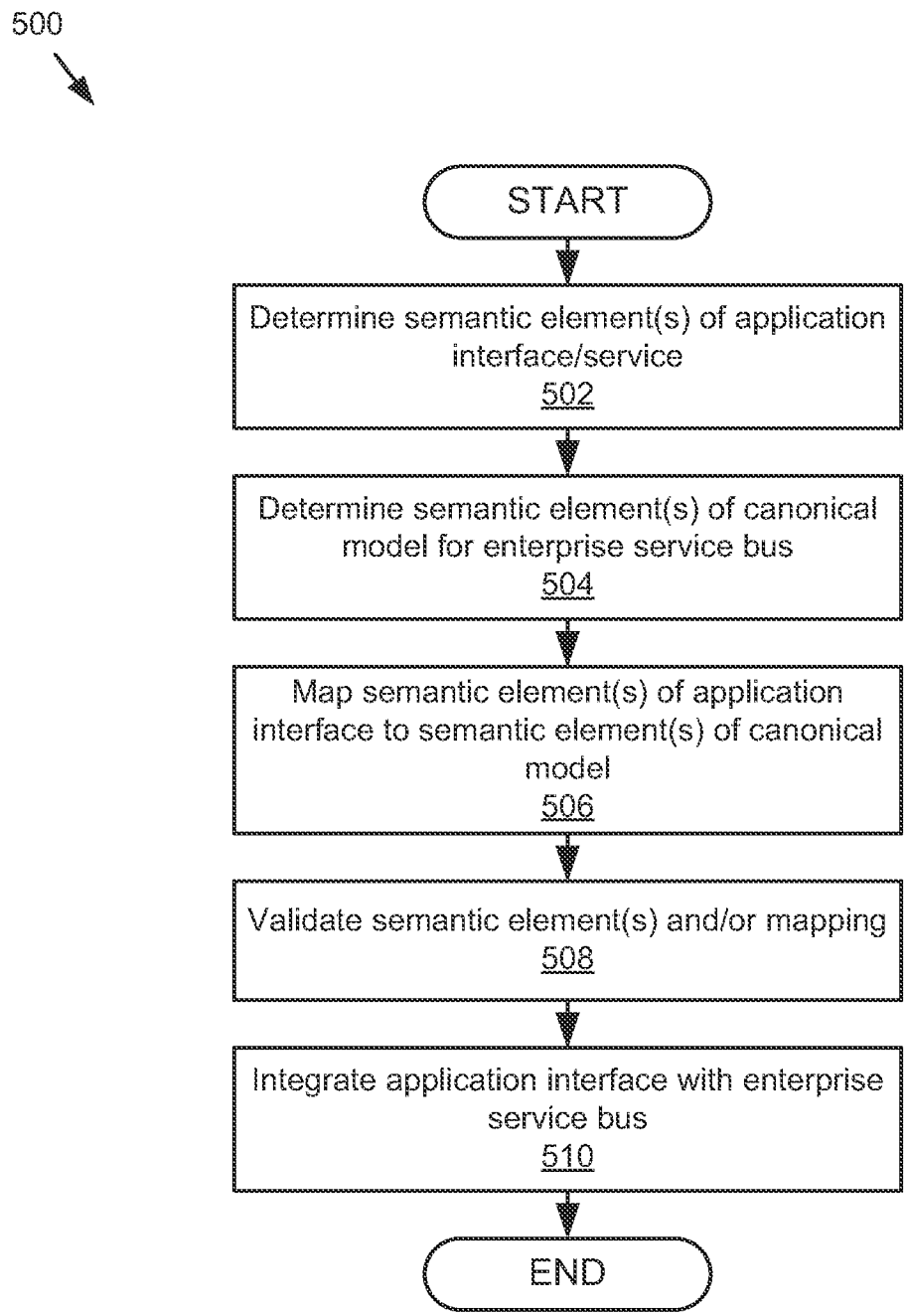
FIGS. 5A and 5B are flowcharts of example methods for mapping, validating, and integrating application interfaces with an example enterprise service bus.

FIG. 5A is a flowchart of an example method 500 for mapping, validating, and integrating an application interface with an example ESB 108. In block 502, the method 500 determines one or more properties (e.g., semantic element(s) for one or more operations) of a first application interface representing a first service (e.g., consumer, provider, etc.) and, in block 504, determines one or more properties (e.g., semantic element(s) for one or more operations) of a second application interface associated with the canonical model of the ESB 108. In some embodiments, the properties of the first and second application interfaces may be determined from information (e.g., ICDs) received from another entity of the system 100, such as a client device 128, a server 122, etc., and stored in data store, such as the integration data store 116.

By way of further example, the semantic element(s) of the first application interface may be determined from a first ICD associated with the first service; and the semantic element(s) of the second application interface may be determined from a second ICD associated with the ESB 108. For example, a user may input the properties of each application interface into a webpage transmitted by the definition module 210 to the client device 128 for display by a client application 130, and the definition module 210 may receive the input for each interface from the client application 130 and store the input as an ICD in the integration data store 116. In some embodiments, the first ICD may describe the functionality of the one or more operations supported by the first service and may include the semantic element(s) for those operations. Similarly, the second ICD may describe the functionality of the one or more operations supported by the canonical model of the ESB 108 and may include the semantic element(s) for those operations.

Proceeding to block 506, the method 500 maps the first semantic element(s) of the first application interface/service with the second sematic element(s) of the canonical model of the ESB 108. In some embodiments, the mapping 506 of the first semantic element(s) with the second semantic element(s) may include connecting the first semantic element(s) with the second semantic element(s) in the centralized repository, such as the integration data store 116. For example, the definition module 210 may perform the mapping by receiving a mapping document that maps the first semantic element(s) to the second semantic element(s) to which they correspond and associating the first semantic element(s) with the second semantic element(s) in the integration data store 116. An example of a mapping may include a first semantic element having a field associated with an input message of the first operation mapped with a second semantic element that includes a field associated with one of an output message and an error message of the second operation. Another example may include a first semantic element having a field associated with an output message of the first operation mapped with a second semantic element that includes a field associated with one of an input message and an error message of the second operation.

In block 508, the method 500 validates the mapping of the first semantic element with the second sematic element. In some embodiments, the validation of the mapping may include verifying whether the semantic element(s) can be mapped, whether any/all required semantic element(s) of either interface are mapped, whether any conflicts with references/dependencies associated with the semantic element(s) being mapped exist, etc. By way of further example, the validation may include verifying that the first operation and the second operation are compatible, for instance, by verifying the compatibility of their fields, data types, data lengths, data formats, requiredness, restrictions, functionality, invocation types, protocols, message types, message structures, or any other property discussed above with reference to ICD properties. In other examples, the validation may verify whether a required semantic element of the first application interface or the second application interface has been mapped, and whether a semantic element incorporated by reference by another application interface is valid.

The method 500 may, in block 510, integrate the application interface with the ESB 108 based on the mapping of the first semantic element(s) with the second semantic element(s). The integration of the application interface may, in some instances, be based on the validation of the mapping and/or semantic element(s) in block 508. In some instances, the application interface is integrated with the ESB 108 at least in part by enabling use in a production environment of the associated ICDs and mapping for sending data between the mapped operations. The method 500 is then complete.

Figure 5B:
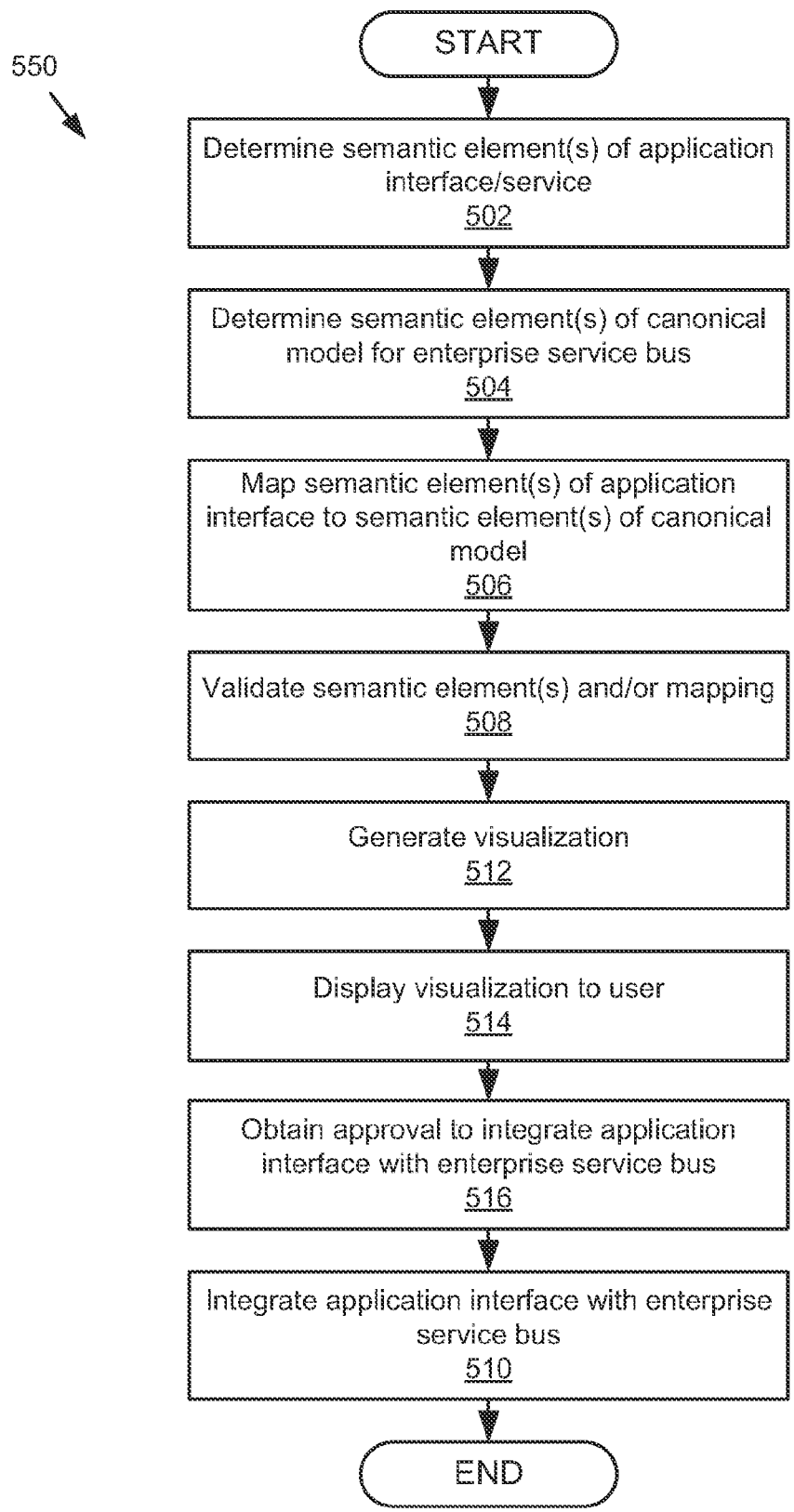

FIG. 5B is a flowchart of an example method 550 for mapping, validating, and integrating an application interface with an example ESB 108. The method 550 may perform the operations of blocks 502, 504, 506, and/or 508 as discussed above with reference to FIG. 5A. Then, in block 512, the method 550 may generate visualization data that graphically illustrates the mapping of the properties (e.g., first semantic element(s)) of the first service with the properties (e.g., second semantic element(s)) of the ESB 108 and provides, in block 514, the visualization data for display to a user. The visualization data may be configured to depict to a user how the properties of a sequence of ICD operations are mapped, such as the semantic element(s) of a first operation of a consumer service to the semantic element(s) of a second operation of the ESB 108. The visualization data may further be configured to depict any issues that exist between the mapped properties (e.g., semantic element(s)).

In block 516, the method 550 obtains approval to integrate the application interface with the ESB 108. In some embodiments, the approval may be based on obtaining approval for one or more of a first ICD which defines the characteristics, requirements, and functionality of the first application interface; a second ICD which defines the characteristics, requirements, and functionality of the second application interface; and the mapping which maps properties from the first ICD with the properties from the second ICD, such as the semantics of the corresponding operations supported by each interface. In block 510, the method 550 then can perform the integration of the application interface with the ESB 108 and is then complete.

It should be understood that, in various embodiments, any number of application interfaces may be integrated with the ESB 108 and ultimately connected to one another for interaction using the methods 500 and/or 550, as discussed in further detail with reference to at least FIG. 4. For example, in a subsequent iteration of methods 500 and/or 550, a third service may be integrated with the ESB 108 by determining third semantic element(s) for an operation included in a third ICD for a third application interface representing a third service (see block 502); mapping the third semantic element(s) with the second sematic element(s) of the canonical model of the ESB 108 (see block 506); validating the mapping of the third semantic element(s) with the second sematic element(s) (see block 508); and integrating the third application interface with the ESB 108 based on the mapping of the third semantic element(s) with the second sematic element(s) (see block 510). In some instances, the first service may be a consumer service and the third service may be a provider service, and the first operation may request that second operation call the third operation to provide the first operation with a certain resource, calculation, information, etc. Visualization data that graphically illustrates the mapping between the first semantic element(s) and the third semantic element(s) via the second semantic element(s) may also be generated and provided (e.g., by the visualization module 212) for display to a user (see block 514).

Figure 6:
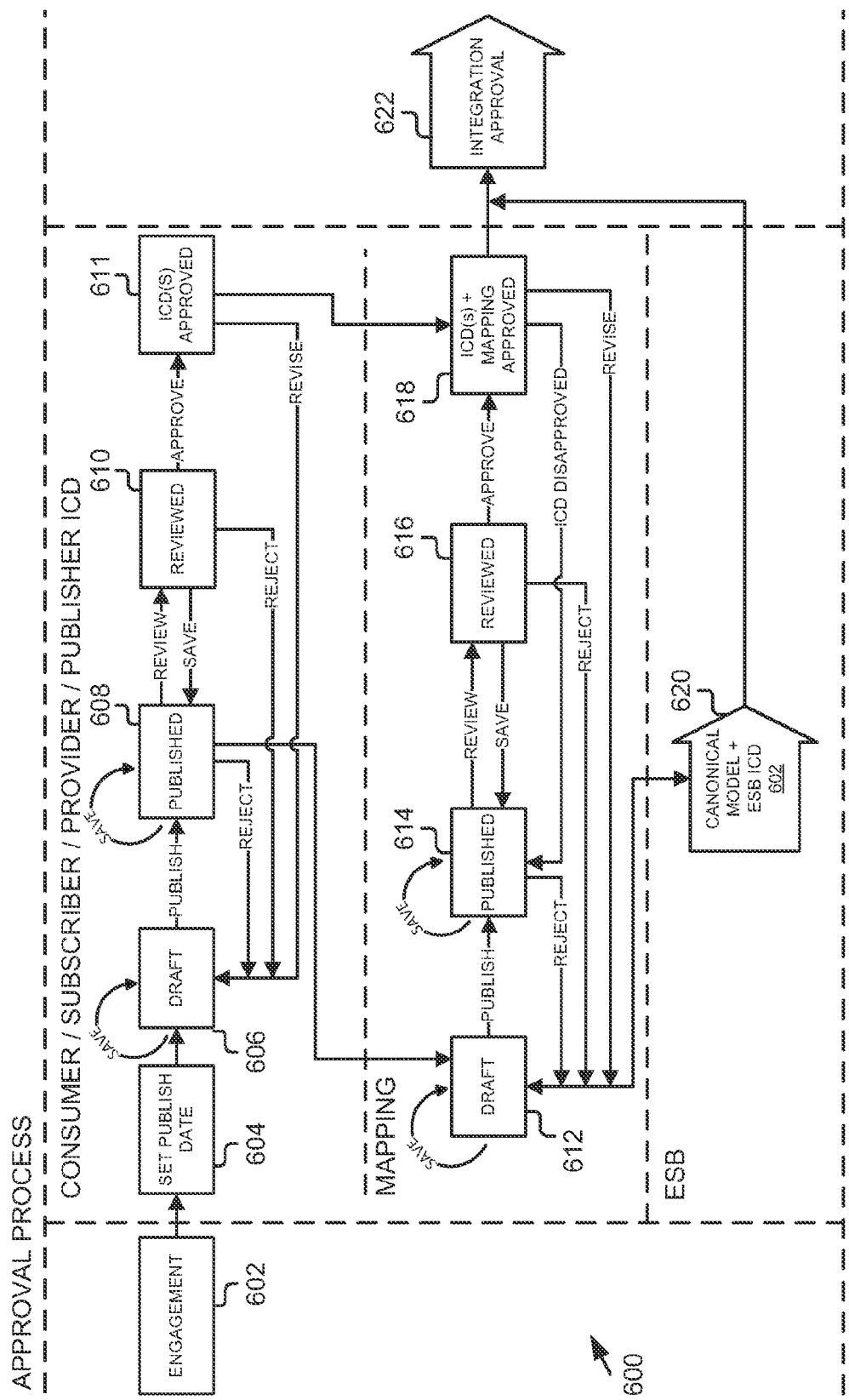
FIGS. 6-8 are flowcharts of an example ICD, mapping, and integration approval process.
Figure 7:
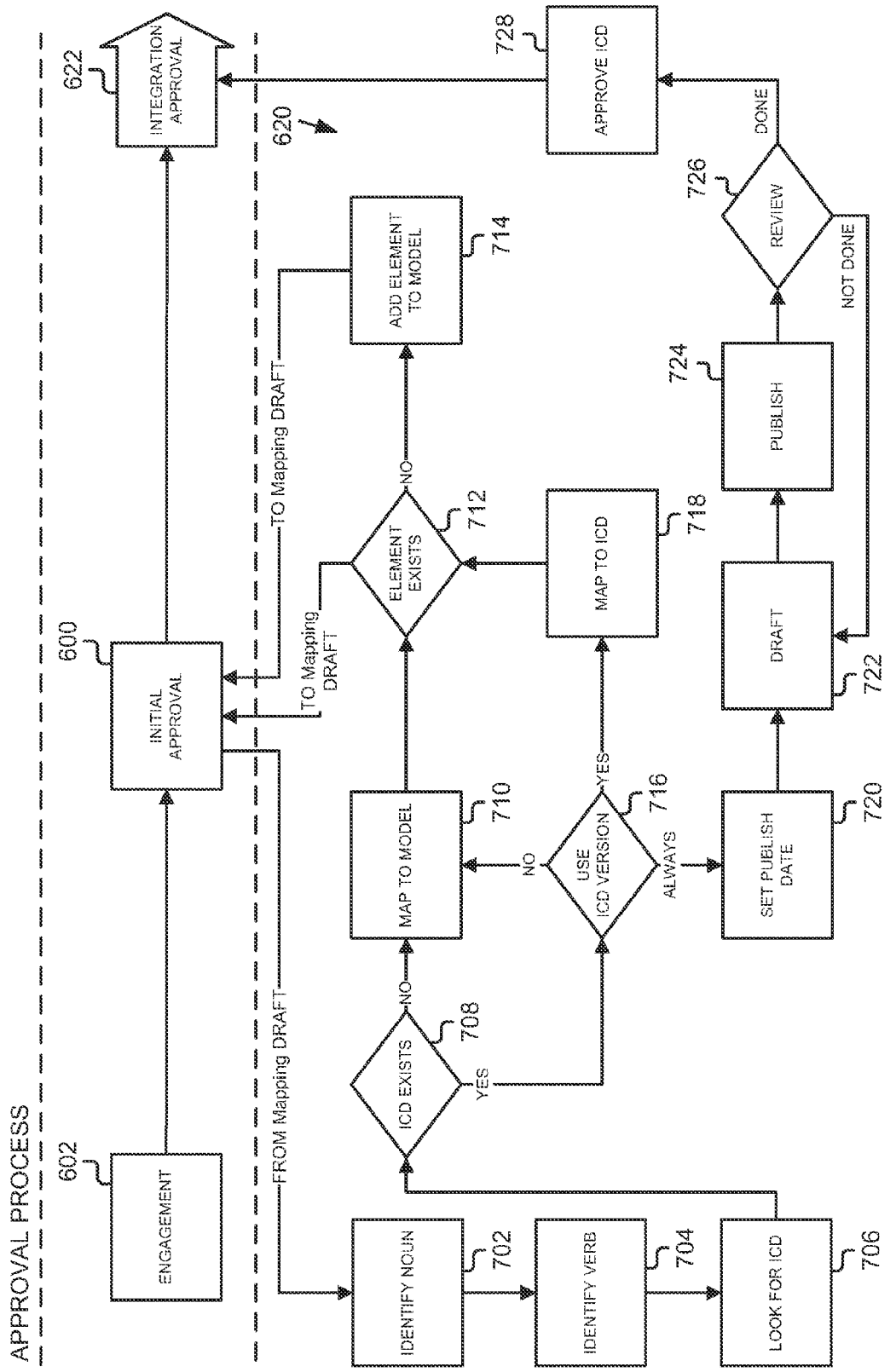
Figure 8:
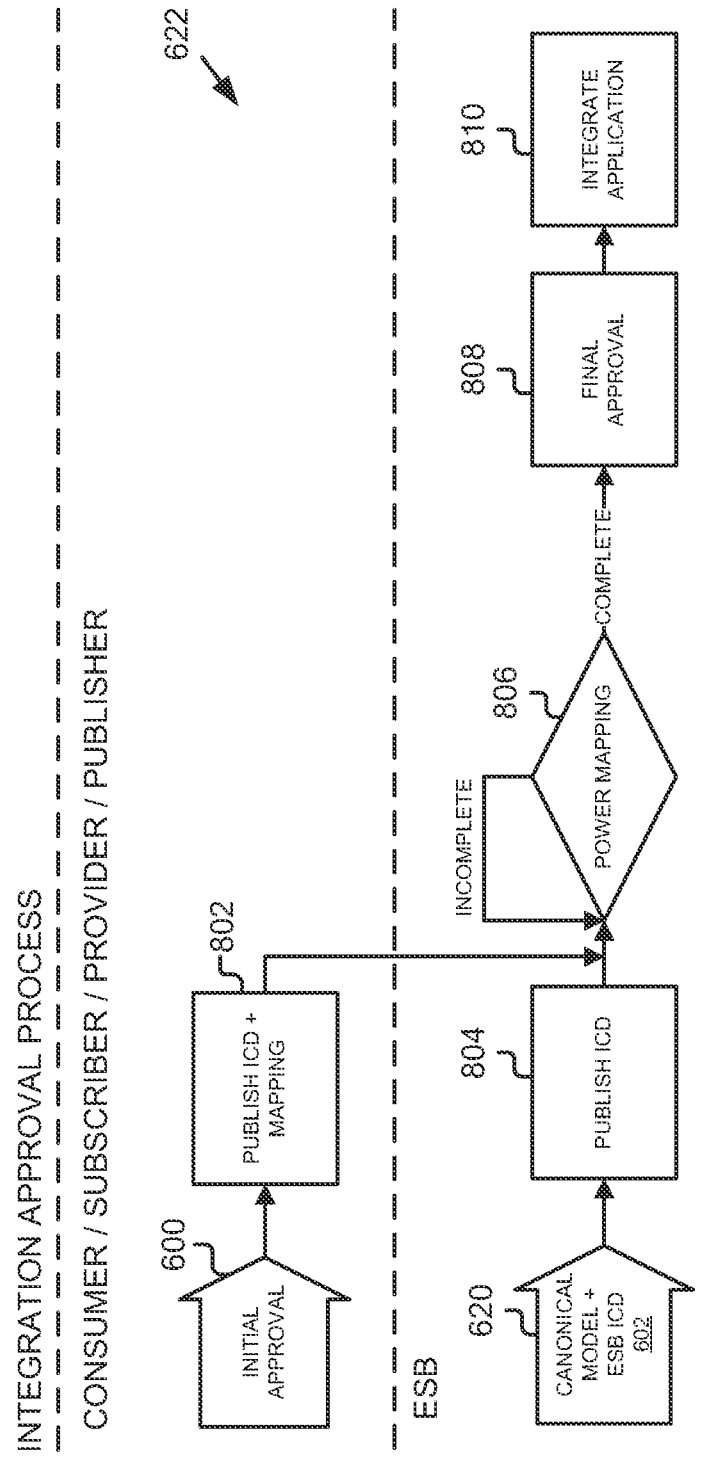

FIGS. 6-8 are flowcharts of an example ICD, mapping, and integration approval process. The method 600, as depicted in FIG. 6, begins by engaging 602 the integration process for an application interface. In some embodiments, the integration process is engaged by receiving a request from a user to integrate an application interface/service with the ESB 108 or to revise an existing integration. For example, a user may submit a request to begin the integration process by logging into a workflow entry point (e.g., webpage) associated with the workflow module 214 using the client application 130 on his/her client device 128 and then accessing, via the entry point, a user interface (e.g., a webpage) for creating/revising an ICD for the application interface to be integrated/revised.

Next, the method 600 sets a publish date in block 604 for the ICD, drafts the ICD in block 606, and publishes the ICD in block 608. In some instances, a component of the integration engine 114, such as the workflow module 214 or the definition module 210, may set the publish date for the ICD by receiving it from a client device 128 and storing it in the integration data store 116. For example, the publish date and the information for the ICD may, in some cases, be entered it into the client application 130 and transmitted to definition module 210 for processing and storage. Responsive to receiving the ICD information, the definition module 210 may generate (e.g., draft, create, modify, version, swimlane, etc.) an ICD based on the information and save it in the integration data store 116.

Once the ICD has been drafted in block 606, the method 600 may submit the ICD for publication. For example, the workflow module 214 and/or definition module 210 may analyze the ICD to determine whether all required elements of the ICD have been properly defined and/or generate and request publication approval from one or more stakeholders (e.g., an ICD author/contributor). If the ICD is determined to contain deficiencies (e.g., errors, insufficient information, publication approval request has been denied, etc.), publication of the ICD may be rejected and the method 600 may return to block 606 for further drafting, revision, etc. If publication of the ICD is approved (e.g., by receiving an approval response from the client device 128 of a stakeholder), the ICD is submitted to block 610 for review. In some embodiments, the ICD may be submitted for review by notifying a stakeholder (e.g., reviewer) of its review status and requesting it be reviewed. For example, a stakeholder may be notified upon logging into a workflow interface or via an electronic message (e.g., email).

If, during the review, the method 600 determines the ICD to be deficient (e.g., contain errors, insufficient and/or inaccurate information, etc.), the ICD may be rejected during review and the method 600 may return to block 606 for further drafting, revision, etc. In some embodiments, an approver/reviewer reviews the ICD by accessing the ICD via an associated review interface displayed on his/her client device 128. Alternatively, if during the review, the ICD is determined to be in order/reviewed in block 610, the method 600 may update the publication of the ICD to indicate such (e.g., by saving an indication of such in the integration data store 116) and the ICD may be submitted to block 611 for approval. If, during the approval, the method 600 determines the ICD to be deficient in some respect (e.g., contain errors, insufficient and/or inaccurate information, approval process not followed, etc.), the may return to block 606 and the ICD approval process may being again. For example, if the ICD is rejected in blocks 608 or 610, the workflow module 214 may generate and send notification to one or more stakeholder(s) (e.g., the author, reviewers, contributors, etc.) notifying them of the reasons for the rejection and requesting the ICD be updated. If approval is received in block 611, the method 600 determines the ICD to be approved. In some implementations, the review and approval performed in blocks 610 and 611 include reviewing and approving the performance and service criteria associated with integrating the application with the ESB 108. For example, the ICD for the application may include requirements for levels of availability, serviceability, performance, operation, etc., and the review and approval of the ICD may represent the negotiation and approval of a service level agreement (SLA) for the application represented by the ICD.

In some embodiments, the workflow module 214 may track the progress of the ICD throughout the ICD approval process (e.g., blocks 606, 608, 610, and 611) by storing record of the progress in the integration data store 116, which may be used for processing by the other stages of the approval process to determine whether to proceed with the integration. For example, the workflow module 214 may then flag the ICD as drafted, ready for publication, reviewed, etc., and the method 600 may proceed to subsequent blocks for further processing. The workflow module 214 may also notify stakeholders of the positive changes in status, such as when the ICD has been successfully published, reviewed, approved, etc.

Upon the ICD being published in block 608, the method 600 proceeds to draft a mapping for the ICD in block 612. In some embodiments, the mapping is input by a user via a client mapping module, such as the mapper 1322, and transmitted to the integration engine (e.g., definition module 210) 114 for processing and storage. For example, an author may input the mapping values using the mapper 1322 operable on the client device 128 of the user. In some embodiments, the mapper 1322 may extend the functionality of the spreadsheet application and provide the user with real-time feedback (e.g., highlighting conflicts, auto populating cells with information from the ICDs being mapped, etc.) for the mapping values, such as the properties of the ICD, being input. In some embodiments, the drafting in block 612 is performed in cooperation with the method 620 discussed further below with reference to at least FIG. 7.

The method 600 continues by publishing 614 the mapping. In some embodiments, the mapping is published in a manner substantially similar to how the ICD is published in block 608. For example, if publication of the mapping is approved (e.g., by receiving an approval response from the client device of a stakeholder), the mapping is submitted to block 616 for review, and if the publication of the mapping is rejected, the method 600 returns to block 612 for further drafting/revision. In some embodiments, the mapping is reviewed in a manner substantially similar to how the ICD is reviewed in block 610. For example, if, in block 616, the method 600 determines, during the review, the mapping to be in order, the method 600 may update the publication of the mapping to indicate such (e.g., by saving an indication of such in the integration data store 116) and the mapping may be submitted to block 618 for approval. Alternatively, if, during the review, the method 600 determines the mapping to be deficient (e.g., contain errors, insufficient and/or inaccurate information, etc.), the mapping may be rejected during review and the method 600 may return to block 612 for further drafting, revision, etc.

In some embodiments, an approver/reviewer reviews the mapping by accessing the mapping via the mapper 1322 (see FIG. 13) on his/her client device 128. Alternatively, if, during the review, the mapping is determined to be in order, the method 600 may update the publication of the mapping to indicate such (e.g., by saving an indication of such in the integration data store 116) and the mapping may be submitted to block 618 for approval. If, during the approval, the method 600 determines the mapping to be deficient in some respect (e.g., contain errors, insufficient and/or inaccurate information, approval process not followed, etc.), the method 600 may return to block 612 and the mapping approval process may being again. For example, if the mapping is rejected in blocks 614 or 616, the workflow module 214 may generate and send notification to one or more stakeholder(s) (e.g., the author, reviewers, contributors, etc.) notifying them of the reasons for the rejection and requesting the mapping be updated. If approval is received in block 618, the method 600 determines the mapping to be approved and proceeds to block 622 for integration approval (e.g., see FIG. 8).

FIG. 7 is a flowchart of an example method 620 for mapping properties of an ICD to a canonical model of an ESB 108. The method 620 begins by receiving a mapping value for an (first) ICD property (e.g., a semantic element) and segmenting the mapping value into a noun element and a verb element in blocks 702 and 704, respectively. For example, the mapping element may include a field (e.g., a noun element) and a transformation rule (e.g. verb element). The field may be a field for an operation of the application interface represented by the ICD and the transformation rule may be an action to be performed using the field. In some cases, the noun element (e.g., field) may be defined in association with an electronic pointer (e.g., XPath) indicating the location of the field in the ICD (e.g., XML ICD document) as well as any specific requirements for the field (e.g., formatting, etc.).

The method 620 then searches in block 706 for an existing ICD that includes a compatible ICD property to which the first ICD property (e.g., field) may be mapped. For example, the integration engine 114 (e.g., the definition module 210 and/or workflow module 214) may query the integration data store 116 for ICDs stored therein that include the field. The ICD(s) identified in 708 may be associated with the canonical model of the ESB 108. In some cases, the definition module 210 and/or workflow module 214 may determine the ICD in block 708 based on mapping information it received from a client device 128 specifying which ICD and property the first ICD property should be mapped to. The mapping information may be received real time or have been previously received and stored in and retrieved from a data store, such as the integration data store 116 by the integration engine 114.

If the method 620 determines in block 708 that such an ICD does not exist, the method 620 continues by mapping in block 710 the ICD property to the canonical model of the ESB 108 based on the mapping value and ICD property. In some embodiments, the operation in block 710 could include operations for defining a new ICD (as discussed elsewhere herein) for the canonical model/ESB 108 that includes the missing fields needed by the mapping.

Alternatively, if the method 620 determines an ICD to exist in block 708, the method 620 proceeds to block 716 and determines whether the ICD can be used (e.g., whether the version of ICD is valid for use). If not, the method 620 proceeds to block 710 and maps the ICD property to the canonical model of the ESB 108 based on the mapping value and ICD property, as discussed above. If, in block 716, the method 620 determines that the ICD version can be used, the method 620 proceeds to map the ICD property to a corresponding property in the ICD found in block 706 (e.g., using information from the mapping). In some embodiments, the method 620 may identify more than one ICD in blocks 708 and 716 for use with the mapping. For example, the method 620 may generate a send a list/summary of the available ICDs to a user as suggestions (e.g., by automatically pre-populating a corresponding table provided by presentation by the mapper 1322) and the user may select the appropriate ICD from the list.

In some embodiments, when mapping the ICD property in block 710 and/or 718, the method 620 determines 712 whether the element being mapped exists in the canonical information model of the ESB 108. If not, the method 620 adds the element to the model. This is advantageous as any gaps in the canonical model can automatically be filled, thus reducing bottlenecks in the mapping process. Once the ICD property has been mapped, the method 620 returns to the initial approval method denoted by block 600 and any remaining ICD properties being mapped are then processed by the method 620.

In some embodiments, the method 620 performs an approval loop for the ICD by setting 720 a publishing date, and drafting 722, publishing 724, reviewing 726 and obtaining approval 728 for the ICD, and the approval obtained in block 728 may be fed as input into the integration approval method 622 as discussed below. In some embodiments, the drafting 722, publishing 724, reviewing 726 and obtaining approval 728 may be performed by the method 620 in a manner substantially similar to the drafting, publishing, reviewing, and publishing process discussed above with reference to FIG. 6.

FIG. 8 is flowchart of an example method 622 for integration approval. The method 622 begins by receiving the output from the methods 600 and 620 and, based thereon, publishing the ICD and mapping from the method 600 for final approval in block 802 and publishing the ESB ICD from the method 620 for final approval in block 804. The method 622 then continues by power mapping 806 the values defined by the mapping. In some embodiments, for the power mapping, the workflow module 214 can provide mapping-related data generated by various blocks of the methods 600, 620, and 622 to all of the stakeholders (e.g., consumer, provider, ESB administrator, etc.) for review. For example, the stakeholders can review end-to-end data flow field by field, transformation rules that get applied along the way, etc. Once the power mapping is complete, the method 622 obtains final approval 808 for integration of the application interface with the ESB 108 and, once received, the application interface/service is integrated with the ESB 108 in block 810. In some implementations, the application may be automatically integrated and/or deployed by the integration engine 114 (e.g., via one or more servers, a cloud-computing platform, etc.) based on the SLA included in the ICD. For example, the integration engine 114 may interact with the enterprise server 108 via an API to integrate and/or deploy the software package reflecting the application interface, and the enterprise server 108 may deploy it locally or remotely based on the server and performance criteria included in the ICD for the application interface. In some implementations, the integration server 112 may notify one or more stakeholders of the application interface of the status of the integration including which server(s) the service was deployed on, the deployment ontology, whether any errors were encountered, and may automatically update the ICD with such information, etc. The method 622 is then complete.

Figure 9A:
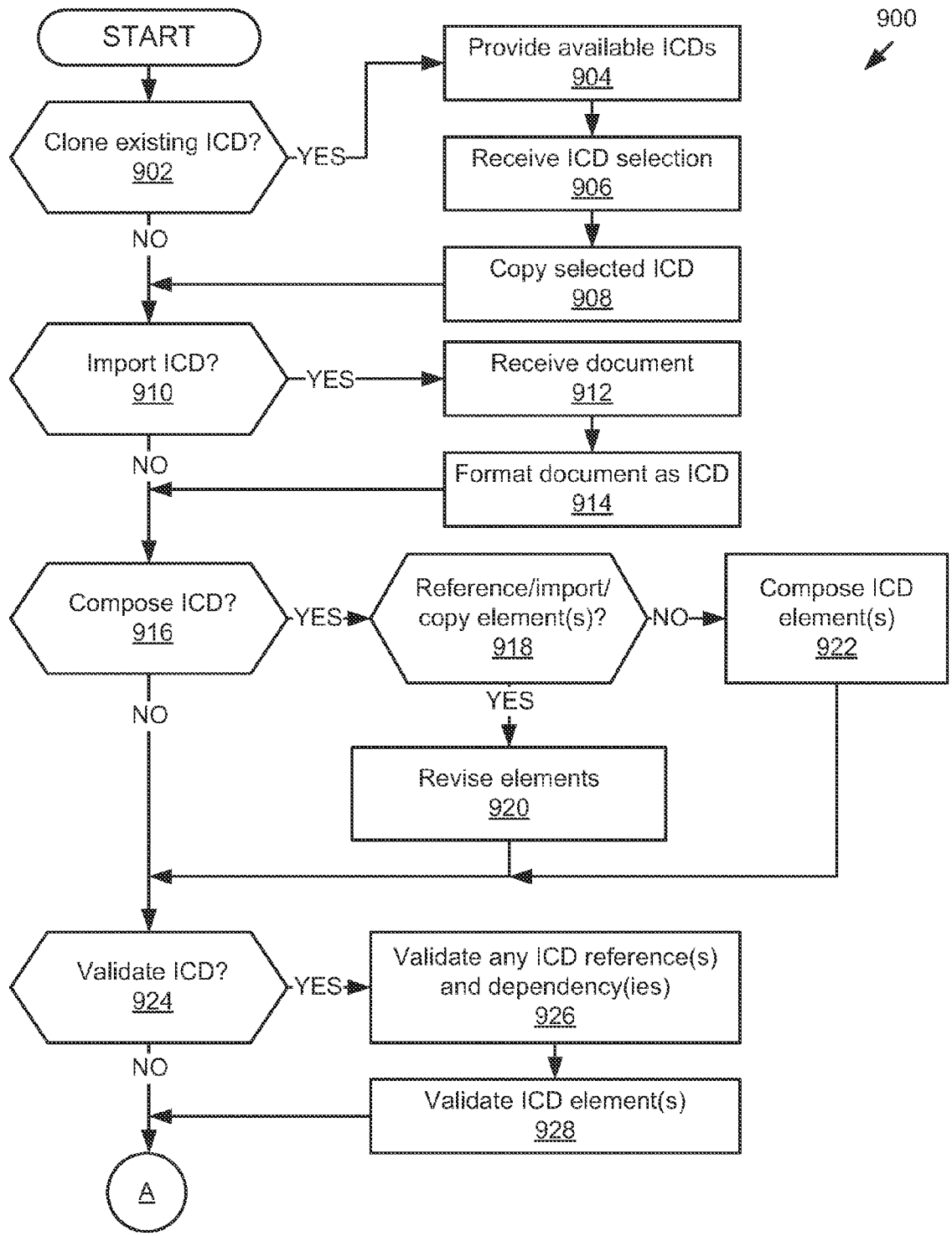
FIGS. 9A-9C are flowcharts of an example method for working with an ICD.
Figure 9B:
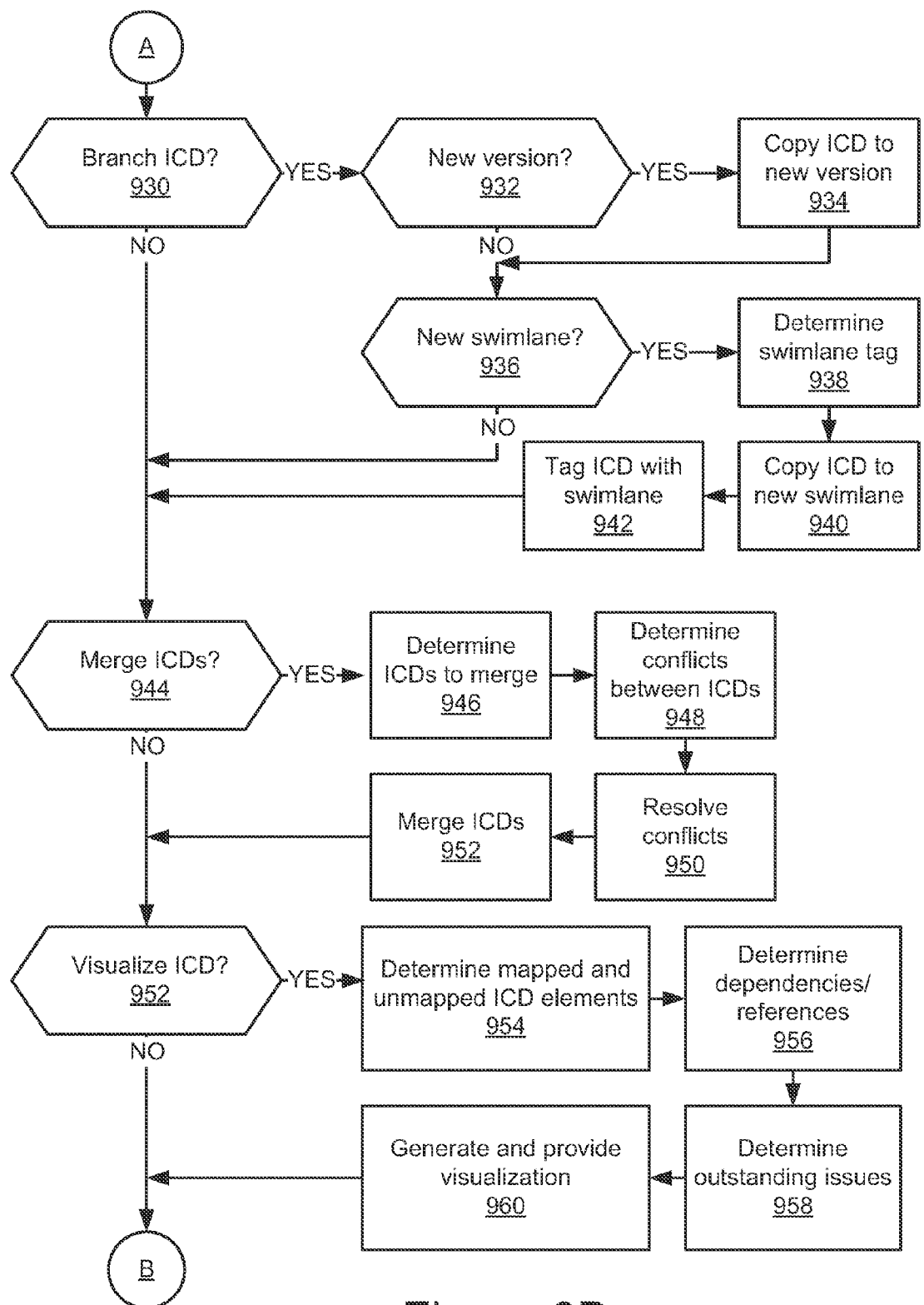
Figure 9C:
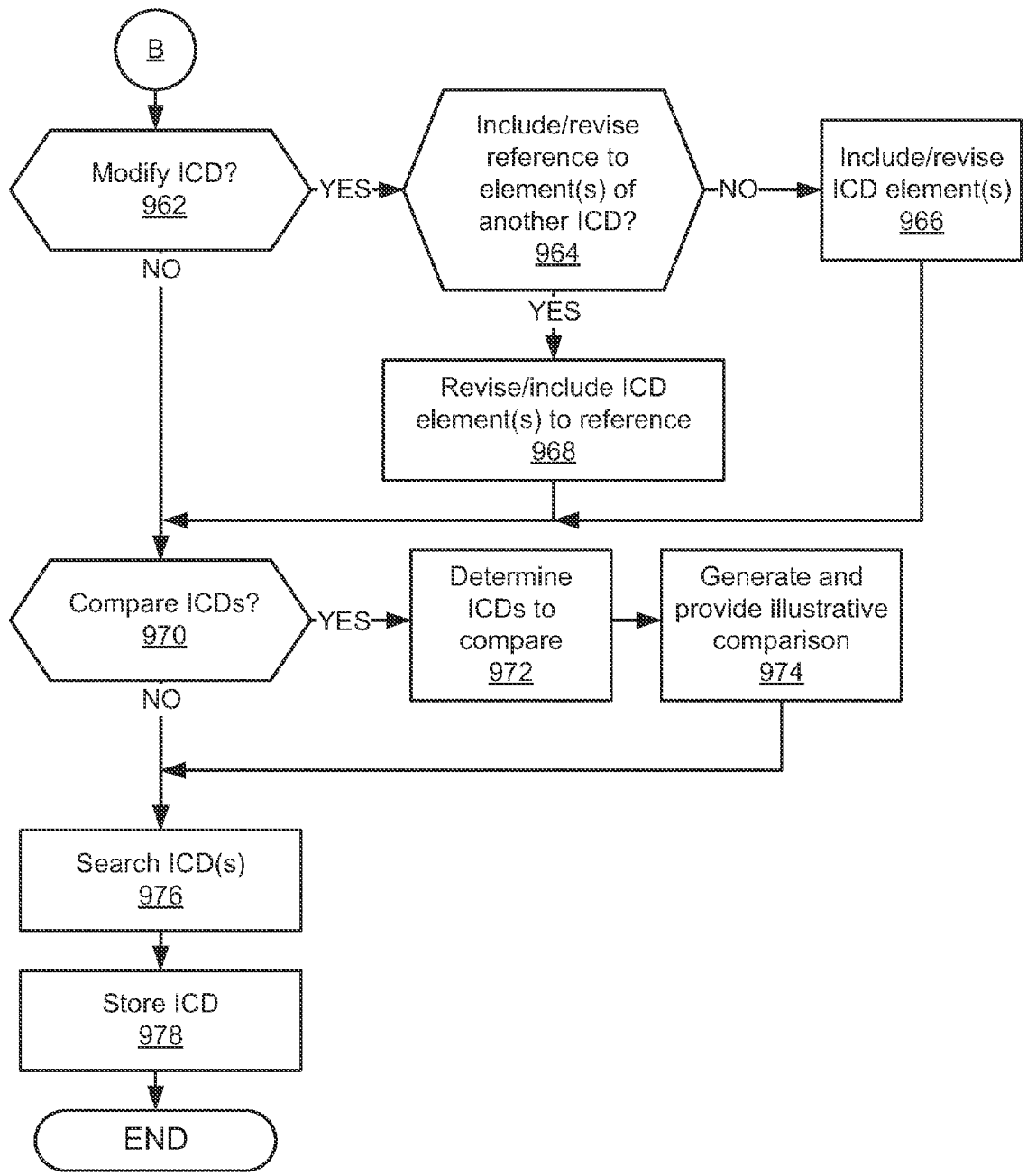

FIGS. 9A-9C are flowcharts of an example method 900 for working with an ICD. The method 900 provides a user working with an ICD a set of options for creating, editing, validating, etc., the ICD. The options may be used by a user or set of users repeatedly/iteratively to create, edit, validate, etc., the ICD. In some embodiments, the operations associated with blocks 902, 910, 916, 924, 930, 944, 952, 962, 970, 976, and/or 978 may be performed in response to receiving user input. For example, a user may select to compose an ICD by cloning an existing ICD, and the definition module 210, in cooperation with the workflow module 214 and/or the visualization module 212 in some cases, may proceed to perform the operations 902, 904, 906, and 908. In other embodiments, the operations associated with blocks 902, 910, 916, 924, 930, 944, 952, 962, 970, 976, and/or 978 may be automatically performed.

In block 902, the method 900 determines whether an existing ICD should be cloned, and if so, provides in block 904 a list of available ICDs for selection by the user, receives in block 906 an ICD selection, and copies in block 908 the selected ICD. In some embodiments, the interface module 1320 receives input requesting to clone an existing ICD and retrieves and provides a list of existing ICDs to the user for selection. The interface module 1320 may then receive an ICD selection and may send that selection in a clone request to the definition module 210. Responsive to receiving the clone request, the definition module 210 may clone the ICD and provide the cloned ICD to the interface module 1320 for display and/or further editing and/or validation by the user. In some embodiments, to clone the ICD, the definition module 210 may duplicate the ICD in the integration data store 116 using a unique identifier and any other information for the cloned ICD provided by the user in the clone request, including, for example, a unique name, description, and/or other metadata, etc.

The method 900 then proceeds to block 910 where it determines whether to import an ICD. If so, the method 900 receives a document in block 912 defining the ICD or portions thereof. For example, the method 900 may import the operations, semantics, and/or other elements of an ICD that may have already been defined using the operations of the method 900. In some embodiments, the interface module 1320 accesses a document on a local file system of the user's client device 128 and uploads it to the definition module 210 as the ICD or for inclusion with or to supplement an existing ICD. In other embodiments, the interface module 1320 cooperates with other elements of the system 100 to facilitate the provision of remotely stored ICD documents to the definition module 210 for further editing and/or storage. Upon receiving the document, the method 900 may format in block 914 the document into a compatible format (e.g., from an XML format into an OWL format).

Next, in block 916, the method 900 proceeds to determine whether to compose the ICD, and if so, determines in block 918 whether one or more elements should be referenced, copied, and/or imported from other previously defined ICDs. For instance, a user may search for and/or specify, using the interface module 1320, an ICD and the definition module 210 may retrieve corresponding ICD information and provide it for presentation to the user in response so the user may import, copy, and/or reference various elements from that ICD. In block 920, the method 900 may receive revisions from the user for the elements referenced, copied, and/or imported in block 918. This reuse of elements is advantageous as it can reduce the amount of time necessary to create the ICD, particularly when two or more ICDs may be closely or loosely related (e.g., belong to a set of related applications). If, in block 922, the method 900 determines that no elements are to be referenced, imported, copied, etc., the method 900 proceeds to compose the elements of the ICD. In some embodiments, the interface module 1320 may present a ICD definition interface (e.g., a web UI) (not shown) with user interface fields for inputting/defining the ICD elements/information, and upon receiving the information, the interface module 1320 may send it to the definition module 210 for processing and/or storage in the integration data store 116.

The method 900 proceeds in block 924 to determine whether the ICD should be validated, and if so, the method 900 validates in blocks 926 and 928 the ICD including, for example, its format, whether all required elements have been defined, whether any references or dependencies associated with the ICD are valid, etc. In some embodiments, the definition module 210 is configured to perform the validation operations in block 924, 926, and 928. As discussed elsewhere herein, the validation may, in some cases, be performed for the user during the ICD drafting process to check his/her work, may be performed in preparation for submitting the ICD for approval and/or review, etc.

Next, in bock 930, the method 900 proceeds to determine whether the ICD should be branched. This branching functionality gives users powerful tools for developing ICDs, including the ability to duplicate an existing production ICD in a development environment where additional operations may be added or existing operations may be improved/revised. For example, in block 932, the method 900 may determine whether a new version of an existing ICD should be created. If so, the method 900 copies in block 934 the ICD to a new version (e.g., by storing a new version with a unique identifier in the integration data store 116). This new version may then be further manipulated using the other operations of the method 900. In some embodiments, more than one swimlane/instance of an ICD may be produced so different development groups may work on different instances of the ICD simultaneously. For instance, the method 900 may determine in block 936 whether a new swimlane should be created for an ICD. If so, the method 900 determines a tag for the swimlane in block 938. In some embodiments, a user inputs a unique identifier as the tag via the interface module 1320, which it provides to the definition module 210 and the definition module 210 uses it to form a new swimlane for the ICD. In other embodiments, the definition module 210 automatically generates a new tag and/or provides a set of suggested tag names for selection by the user. In block 940, the method 900 may create a new swimlane for the ICD by making a copy of the ICD. For example, the definition module 210 may store another instance of the ICD and tag and/or index that instance in block 942 using the tag determined in block 938. However, other implementations are contemplated where a new swimlane may be created by updating and/or adding a tag of that swimlane. For example, a swimlane may be initially tagged as a "development" swimlane and then promoted to a "production" swimlane in response to receiving input from a user selecting to promote the swimlane to production status from development status. The method 900 may then tag the swimlane by replacing its "development" tag with a "production" tag. By way of further example, the method 900 may process a swimlane serially by tagging the same swimlane with different tags over time (e.g., to reflect its evolution) and/or in parallel by creating and tagging swimlanes belonging to the same ICD branch with different tags to provide for parallel development.

Moving on, in block 944, the method 900 determines whether two or more ICDs should be merged, and if so, the method 900 determines which ICDs should be merged in block 946, determines whether there are any conflicts between those ICDs in block 948, and then resolves those conflicts in block 950 so the ICDs can be merged in block 952. In some embodiments, the user may input which ICDs are to be merged via the interface module 1320, which sends the input to the definition module 210 of the integration engine 114, and the definition module 210 retrieves the ICDs from the integration data store 116 and compares their respective elements to one another to determine which elements remained the same and which have been revised (e.g., based on when they were revised, number of times they were revised, which users revised them, etc.). The definition module 210 may then merge the ICDs into a single ICD. In some cases, the elements of the ICDs being merged may conflict and the definition module 210 resolve those conflicts so the ICDs may be merged. For example, the definition module 210 may detect that a first ICD and a second ICD both contain revisions to an operation (e.g., a field was added or modified) that are different (e.g., by comparing the XML representations of the ICDs) and may, in cooperation with the user interface 1320, present the comparison data to the user which includes the conflict and prompts the user to select which revision should govern and be included in the merged ICD.

In block 952, the method 900 proceeds to determine whether to facilitate visualization of the ICD, and if so, the method 900 determines the mapped and unmapped elements of the ICD in block 954, determines any dependencies and/or references of the ICD in block 956, determines any outstanding issues that need to be resolved in the ICD in block 958, and then generates and provides in block 960 visualization data that describes the configuration state of the ICD including any issues. The determinations made in blocks 954, 956, and 958 may be based on data retrieved from the integration data store 116, including, for example, mapping data associated with the ICD indicating which elements have been mapped and which are not, ICD data indicating which elements are required and must be mapped before the ICD can be approved, determining which elements have been incorporated into or referenced from other ICDs, etc. In some embodiments, the visualization module 212 may retrieve the data and perform the operations in blocks 952, 954, 956, and 958, and generate and provide the visualization data in block 960 to the interface module 1320 for rendering and display to the user. Example user interfaces for visualizing the ICDs and how they are mapped via the ESB 108 to one another are discussed in further elsewhere herein, including, for example, with reference to FIGS. 14 and 15.

Next, the method 900 determines whether the ICD should be modified in block 962, and if so, the method 900 determines in block 964 whether to include and/or revise element(s) referenced from one or more other ICDs. If one or more elements are to be included or revised, the method 900 proceeds to revise and/or include these elements in block 968. For example, a user may select to modify a first ICD to incorporate (directly or by reference) semantics for an operation defined by a second ICD and may provide input identifying those semantics. In response, the interface module 1320 may send that input to the definition module 210, and the definition module 210 and modify the working instance of the ICD (e.g., as cached in memory, stored in the integration data store 116, etc.) to include those semantics. In some instances, the operations in blocks 964 and 968 may be performed in conjunction with other operations including for example, the importation and composition operations (e.g., 910, 912, 914, 916, 918, 920, and/or 922) discussed above. If the method 900 determines in block 964 not to include and/or revise the referenced elements, the method 900 proceeds to block 966 to include and/or revise one or more ICD elements. For example, the user may input revisions to the ICD via an interface displayed by the interface module 1320 and the interface module 1320 may provide the revisions to the definition module 210 for processing and/or storage in the integration data store 116, as discussed elsewhere herein.

In block 970, the method 900 determines whether to compare one or more ICDs, and if so, determines in block 972 which ICDs should be compared and then generates an illustrative comparison of the ICDs in block 974. In some embodiments, the visualization module 212 and/or definition module 210 generates and provides the illustrative comparison to a user for review. For example, a user may select which ICDs to compare via a user interface rendered for display by the interface module 1320. The interface module 1320 may communicate to the definition module 210 and/or the visualization module 212 which ICDs should be compared and the definition module 210 and/or the visualization module 212 may compare the ICDs (e.g., by performing a diff function on their XML representations) and provide the diff data to the interface module 1320 for presentation to the user in a manner that visually illustrates the differences between them.

Next, in block 976, the method 900 may search for one or more ICDs. For example, a user may wish to locate an existing ICD which he or she may want to copy, clone, edit, reference, etc., and may utilize the search functionality of the integration engine 114 to find it. In some embodiments, to search for one or more ICDs, a user may enter one or more search terms into interface rendered by the interface module 1320 and the interface module 1320 may send those search terms to the definition module 210 and the definition module 210 may query the integration data store 116 for one or more ICDs that match the search terms. In some embodiments, the user may enter a unique identifier for the ICD, a name for the ICD, or any other information included in the ICD that may be used to find it. Next, in block 978, the method 900 may proceeds to store the ICD. In some embodiments, the method 900 may store the ICD after it has been manipulated using one or more of the operations of the method 900. The ICD may be stored incrementally, upon user command, or may be stored after it has been fully created, edited, and/or revised (e.g., by the definition module 210). In some embodiments, the ICD may initially be stored locally on the client device 128 of the user and then later transmitted to the integration engine 114 for storage in the integration data store 116, or may be stored in the integration data store 116 as it is being manipulated. Other embodiments are also contemplated and possible. The method 900 is then complete.

Figure 10A:
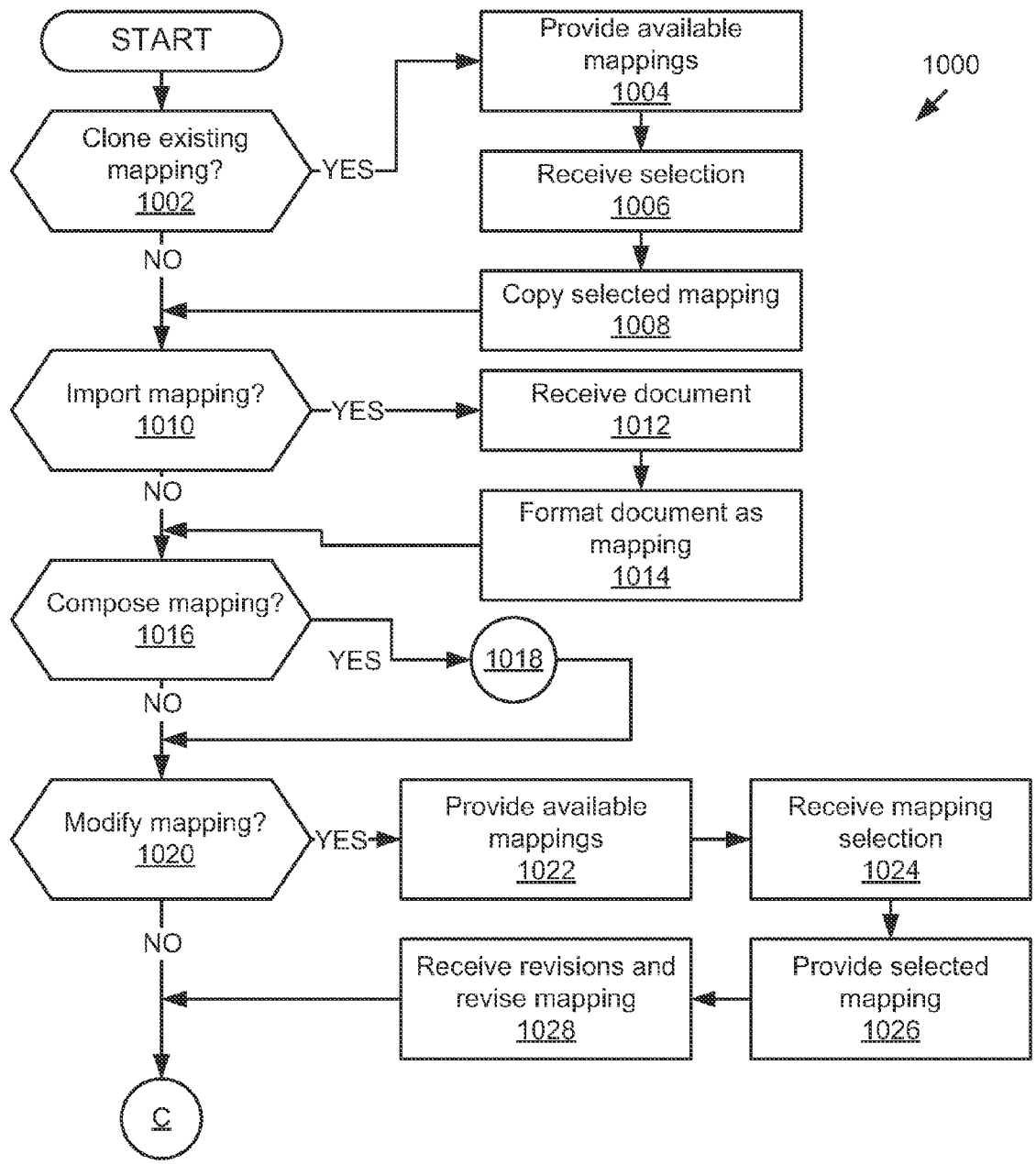
FIGS. 10A-10B are flowcharts of an example method for working with a mapping.
Figure 10B:
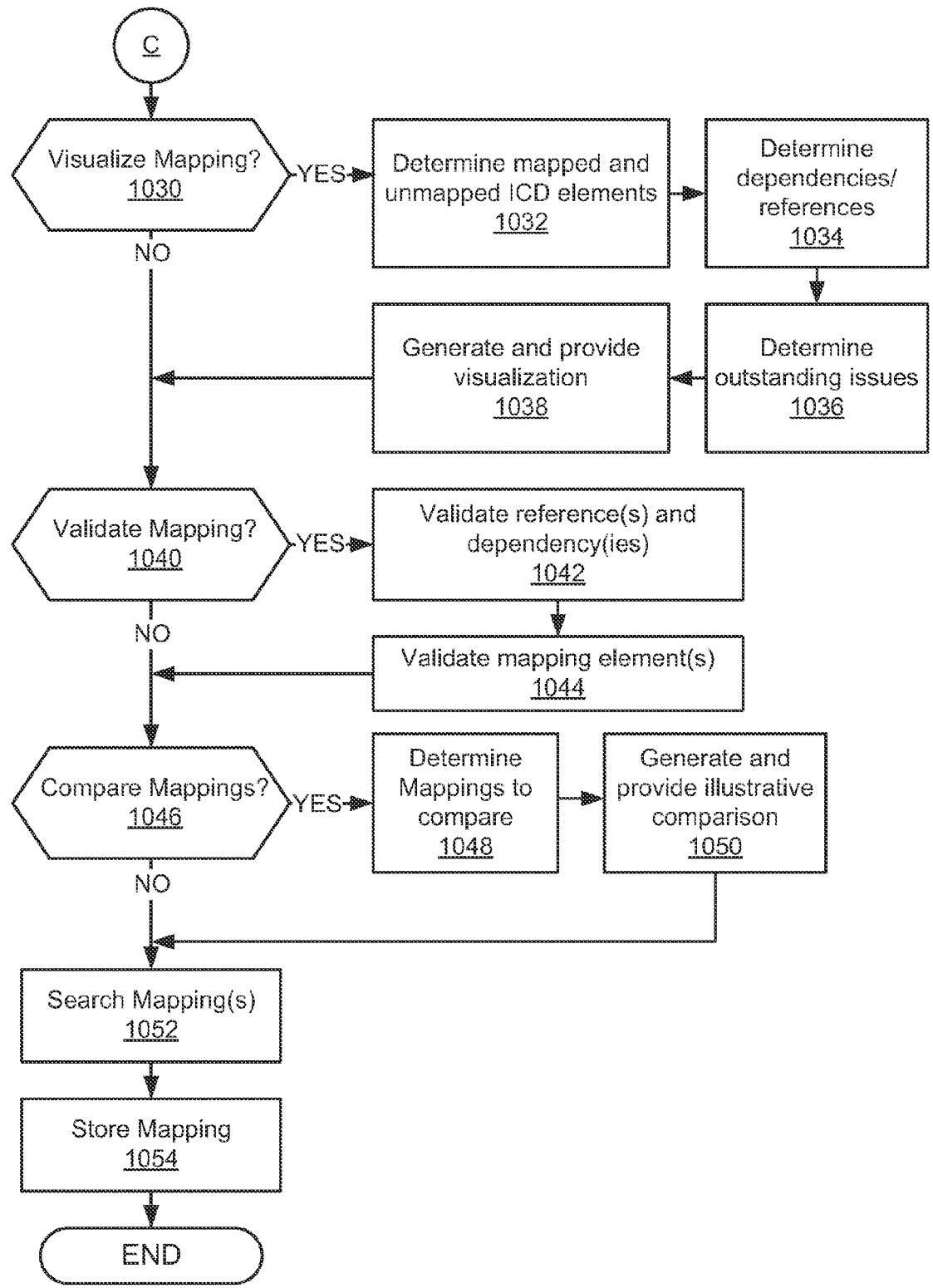

FIGS. 10A-10B are flowcharts of an example method 1000 for working with a mapping. The method 1000 provides a user working with a mapping a set of innovative options for creating, editing, validating, etc., the mapping. The options may be used by a user or set of users repeatedly/iteratively to create, edit, validate, etc., the mapping. In some embodiments, the operations associated with blocks 1002, 1010, 1016, 1020, 1030, 1040, 1046, 1052, and/or 1054, etc., may be performed in response to receiving user input. For example, a user may select to compose a mapping by cloning an existing mapping, and the definition module 210, in cooperation with the workflow module 214 and/or the visualization module 212 in some cases, may proceed to perform the operations 1002, 1004, 1006, and 1008. In other embodiments, the operations associated with blocks 1002, 1010, 1016, 1020, 1030, 1040, 1046, 1052, and/or 1054, etc., may be automatically performed.

In block 1002, the method 1000 determines whether an existing mapping should be cloned, and if so, provides a list of available mappings for selection by the user in block 1004, receives a mapping selection in block 1006, and copies the selected mapping in block 1008. In some embodiments, the mapper 1322 receives input from the client application 130 requesting to clone an existing mapping and retrieves and provides a list of existing mappings to the user for selection. The mapper 1322 may then receive a mapping selection in block 1006 and may send that selection as a close request to the definition module 210. Responsive to receiving the clone request, the definition module 210 may clone the mapping and provide the cloned mapping to the mapper 1322 for display and/or further editing and/or validation by the user. In some embodiments, to clone the mapping, the definition module 210 may duplicate the mapping in the data store using a unique identifier and any other information for the cloned mapping provided by the user in the clone request, including, for example, a unique name, description, and/or other metadata, etc.

The method 1000 then proceeds to block 1010 where it determines whether to import a mapping. If so, the method 1000 receives a document in block 1012 defining the mapping or portions thereof and formats the document as a mapping in block 1014. In some embodiments, the mapper 1322 accesses a document from a local file system of the user's client device 128 and imports and optionally formats the document as a mapping. In some instances, the imported mapping may be further manipulated using the other operations of the method 1000. The mapper 1322 may store the mapping locally and/or may send the mapping to the definition module 210 for further processing, formatting, and/or storage by the definition module 210, as discussed elsewhere herein.

Next, in block 1016, the method 1000 proceeds to determine whether to compose the mapping, and if so, proceeds, in block 1018, the method of which is discussed in further detail below with reference to FIG. 11.

Returning to FIG. 10A, the method 1000 proceeds to block 1020 where it determines whether the mapping should be modified, and if so, the method 1000 provides in block 1022 one or more available mappings, receives in block 1024 a user selection of a mapping, provides in block 1026 the selected mapping to the user, and receives one or more revisions to the mapping and revises the mapping based thereon (e.g., stores the revisions to the mapping in the integration data store 116 for approval and use by the ESB 108). In some instances, block 1028 may be processed in conjunction with other operations including for example, the importation and composition operations (e.g., associated with blocks 1010, 1016, etc.) discussed above. For example, the user may input revisions to the mappings using the functionality of the mapper 1322 and the mapper 1322 may receive and provide the revisions to the definition module 210 for processing and/or storage in the integration data store 116, as discussed elsewhere herein.

In block 1030, the method 1000 proceeds to determine whether to facilitate visualization of the mapping, and if so, the method 1000 determines the mapped and unmapped elements of the ICDs associated with the mapping in block 1032, determines any dependencies and/or references associated with the mapping in block 1034, determines any outstanding issues that need to be resolved in the ICD in block 1036, and then generates and provides in block 1038 visualization data that describes the configuration state of the mapping including any issues. The determinations made in blocks 1032, 1034, and 1036 may be based on data retrieved from the integration data store 116, including, for example, mapping data indicating which ICD elements have been mapped and which have not, ICD data indicating which ICD elements are required and must be mapped, data indicating whether any mapped ICD elements have be incorporated into or referenced by other mappings or vice versa, etc. In some embodiments, the visualization module 212 may retrieve the data and perform the operations in blocks 1032, 1034, 1036, and generate and provide the visualization data in block 1038 to the mapper 1322 and/or interface module 1320 for rendering and display to the user. In some instances, the operations in blocks 1032, 1034, 1036, and/or 1038 may be performed in conjunction with the ICD visualization operations (e.g., in blocks 954, 956, 958, and/or 960); the ICD validation operations (e.g., in blocks 924, 926, and/or 928), and/or the mapping validation operations (e.g., in blocks 1040, 1042, and/or 1044) to provide the user a complete visualization of how the mappings and ICDs are connected and whether any conflicts exist and/or need to be resolved.

The method 1000 proceeds in block 1040 to determine whether the mapping should be validated, and if so, the method 1000 validates in blocks 1042 and 1044 the mapping including, for example, its format, whether all required ICD elements have been mapped, whether any of the mapped elements conflict or are improperly mapped, whether any references or dependencies associated with the mapped elements are valid, etc. In some embodiments, the definition module 210 may perform or cooperate with other modules to perform the validation operations in block 1040, 1042, and 1044. Further, the definition module 210 may cooperate with the mapper 1322 to receive the mapping information provided by the user for validation and provide validation data indicating whether any errors and/or conflicts exist in the mapping. As discussed elsewhere herein, the mapping validation may, in some cases, be performed for the user during the mapping drafting process to check his/her work, may be performed in preparation for submitting the mapping for approval and/or review, etc.

In block 1046, the method 1000 determines whether to compare one or more mappings, and if so, determines in block 1048 which mappings should be compared and then generates and provides an illustrative comparison of the mappings in block 1050. In some embodiments, the visualization module 212 and/or the definition module 210 generates and provides the illustrative comparison to a user for review. For example, a user may select which mappings to compare via a user interface rendered for display by the interface module 1320. The interface module 1320 may communicate which mappings should be compared to the definition module 210 and/or the visualization module 212 and the definition module 210 and/or the visualization module 212 may compare the mappings (e.g., by performing a diff function on their XML representations) and provide the diff data to the interface module 1320 for presentation to the user in a manner that visually illustrates the differences between them.

Next, in block 1052, the method 1000 may search for one or more mappings. For example, a user may wish to locate an existing mapping which he or she may want to copy, clone, edit, reference, etc., and may utilize the search functionality of the integration engine 114 to find it. In some embodiments, to search for one or more mappings, a user may enter one or more search terms into interface rendered by the mapper 1322 or interface module 1320 and that component may send those search terms to the definition module 210 and the definition module 210, may query the integration data store 116 for one or more mappings that match the search terms. In some embodiments, the user may enter a unique identifier for the mapping, a name for the mapping, or any other information included in the mapping that may be used to find it. Next, in block 1054, the method 1000 may proceed to store the mapping. In some embodiments, the method 1000 may store the mapping after it has been manipulated using one or more of the operations of the method 1000. As with the ICD, the mapping may be stored incrementally, upon user command, or may be stored after it has been fully created, edited, and/or revised. In some embodiments, the mapping may initially be stored locally on the client device 128 of the user and then later transmitted to the integration engine 114 for storage in the integration data store 116, or may be stored in the integration data store 116 as it is being manipulated. Other embodiments are also contemplated and possible. The method 1000 is then complete.

Figure 11:
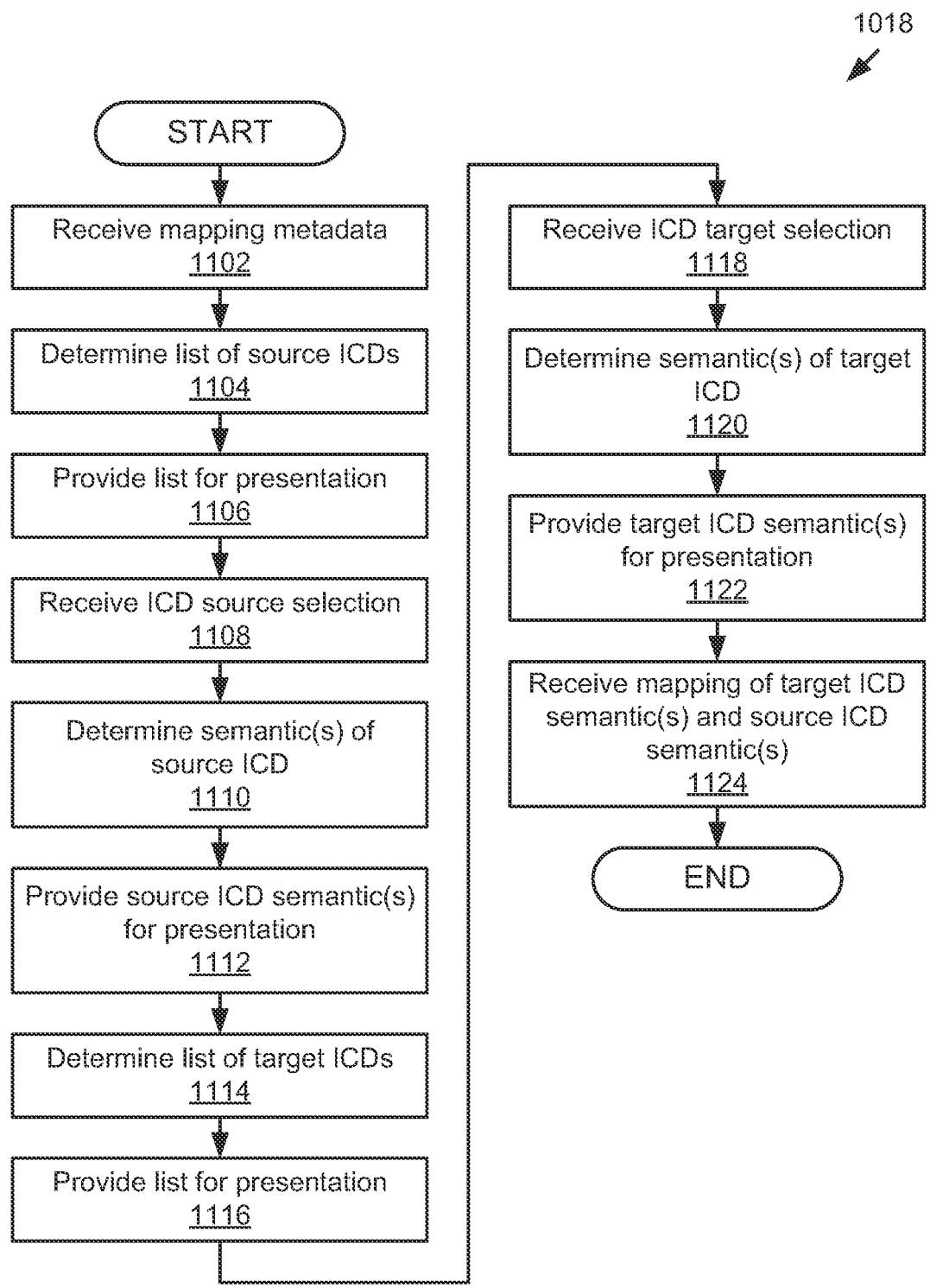
FIG. 11 is a flowchart of an example method for composing a mapping.

FIG. 11 is a flowchart of an example method 1018 for composing a mapping as introduced above with reference to FIG. 10A. The method 1018 begins by receiving mapping metadata in block 1102, determining a list of source ICDs in block 1104, and providing the list of source ICDs for presentation to a user in block 1106. In response to providing the list of source ICDs to the user for presentation, the method 1018 receives a selection of the source ICD in block 1108, determines one or more semantics of the source ICD in block 1110, and provides the one or more source ICD semantics for presentation to the user in block 1112. In some embodiments, the definition module 210 may query the integration data store 116 for the list of source ICDs and provide it to the mapper 1322, and the mapper 1322 may provide the list for presentation to the user and receive the user's selection of an ICD from the list. The mapper 1322 may then send the selected ICD to the definition module 210, which may retrieve the semantic(s) for the ICD from the integration data store 116 and provide them to the mapper 1322 for presentation to the user.

The method 1018 also proceeds to determine a list of target ICDs in block 1114 and provides that list for presentation to the user in block number 1116. In response to providing the list of target ICDs for presentation to the user, the method 1018 receives a selection of a target ICD from the list presented determines one or more semantics of the target ICD in block 1120. Then, the method 1018 provides the one or more target ICD semantics for presentation to the user in block 1122.

Responsive to providing the one or more source ICD semantics and the one or more target ICD semantics in blocks 1112 and 1120, respectively, the method 1018 receives in block 1124 a mapping of or more of the target ICD semantics with one or more of source ICD semantics. Thus, based on the source and target semantic(s) determined in blocks 1110 and 1120, respectively, a mapping of one or more target ICD semantic(s) with one or more source ICD semantic(s) may be determined by the method 1018.

In some embodiments, when inputting mapping information, a user may select a source ICD semantic(s) to link to a target ICD semantic(s), and in doing so, may specify how the source semantic(s) should be transformed and/or what action should be performed (e.g., via a transformation rule) in order for the source semantic(s) to be compatible with the target ICD semantic(s). As a further example, the mapper 1322 may receive the source and target ICD semantics from the definition module 210 and provide them for presentation in a user interface, and the user may input via the mapper 1322 which source and target ICD semantics should be linked and indicate the rules for them to be linked, including any actions and/or formatting that may need to be performed in order for information to flow between the operations relying on those semantics. The input provided by the user may be sent by the mapper 1322 back to the definition module 210 for further processing and/or storage in the integration data store 116 in association with the ICDs being mapped by it.

Figure 12:
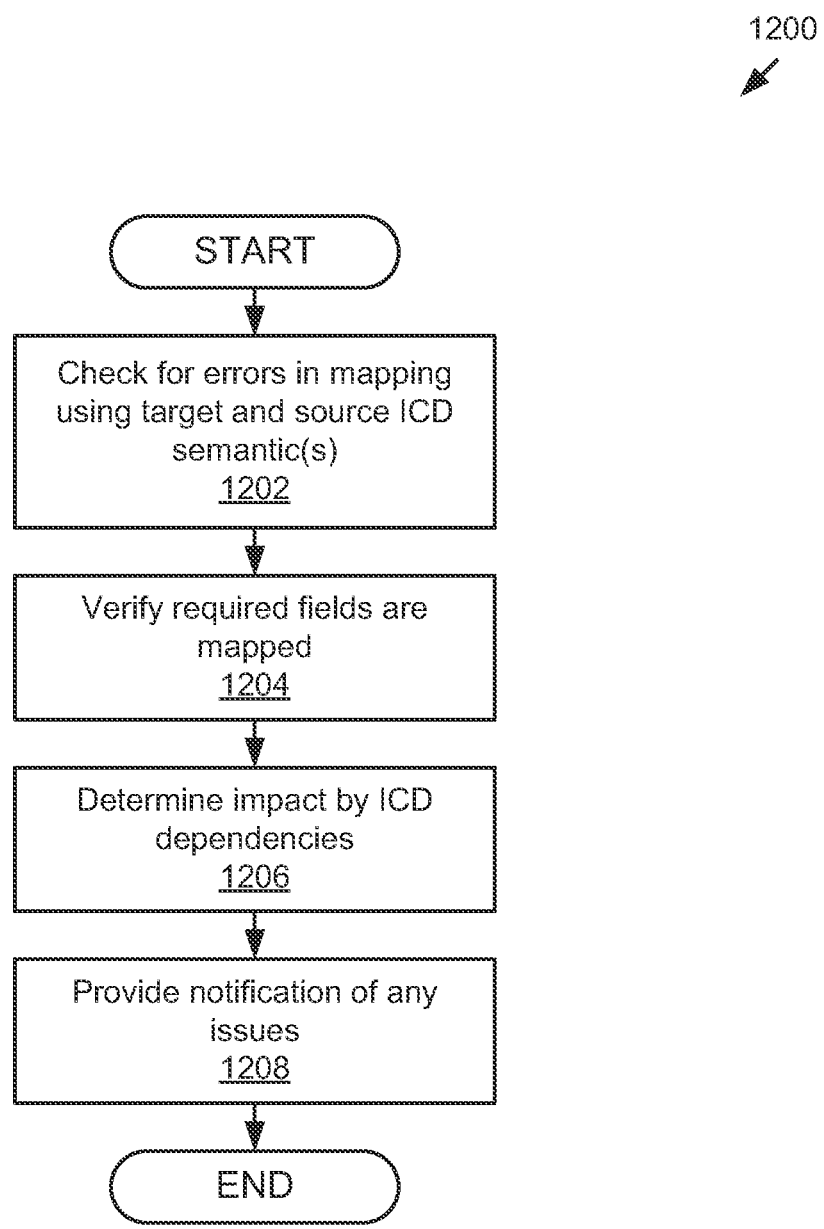
FIG. 12 is a flowchart of an example validation and impact analysis method.

FIG. 12 is a flowchart of an example validation and impact analysis method 1200. In some embodiments, the method 1200 expansion of other operations discussed herein, such as the blocks 1042 and/or 1044 of the method 1000 discussed above with reference to at least FIGS. 10A and 10B. In block 1202, the method 1200 checks for errors in a mapping based on the semantics included in the mapping. For example, the method 1200 may analyze whether target ICD semantics and source ICD semantics that are mapped one another by the mapping are compatible with one another. For instance, the mapping may incorrectly map an input message semantic of a source ICD to an input message semantic of a target ICD instead of a corresponding output message semantic of that target ICD, and the method 1200 may identify the incompatibility and notify a stakeholder of the impact.

Next, the method 1200 verifies in block 1204 whether all conditions for mapping the ICDs have been met, such as whether all required fields of the ICDs being mapped by the mapping have been mapped. For example, the ICDs being mapped by the mapping may include elements that are required to be mapped or that require certain conditions to be met before a mapping can be approved. These elements may be flagged as such by the ICDs, such as with a required or conditional flag, etc., which may be used to determine whether the conditions for mapping the ICDs have been satisfied.

In block 1206, the method 1200 determines whether any ICD dependencies impact the mapping. For example, if an ICD includes a reference to another ICD, and that other ICD has been changed while the mapping is being composed or after it has been composed, the method 1200 may determine whether any of those changes affect the mapping. For instance, if a required element is added to an ICD upon which a mapped ICD depends, then the method 1200 can identify that change. Next, in block 1208, the method 1200 notifies any stakeholders of any issues identified during the validation process, such as any errors, outstanding requirements, or impacts determined in blocks 1202, 1204, and 1206, respectively. The stakeholder(s) may include any user(s) associated with the mapping process including, for example, the user composing the mapping, a reviewer, an approver, etc.

In some embodiments, the operations in blocks 1202, 1204, 1206, and/or 1208 may be performed real-time (e.g., by at least the definition module 210) when a mapping is being composed for example, using the operations of the method 1018. This is advantageous as the user composing the mapping may be immediately informed of the incompatibility and may revise the mapping to resolve the error. In other embodiments, the operations of the method 1200 may be performed (e.g., by at least the definition module 210) at a later stage, such as during visualization, review, approval, or power mapping, as discussed above with reference to at least FIGS. 6-8.

Figure 13:
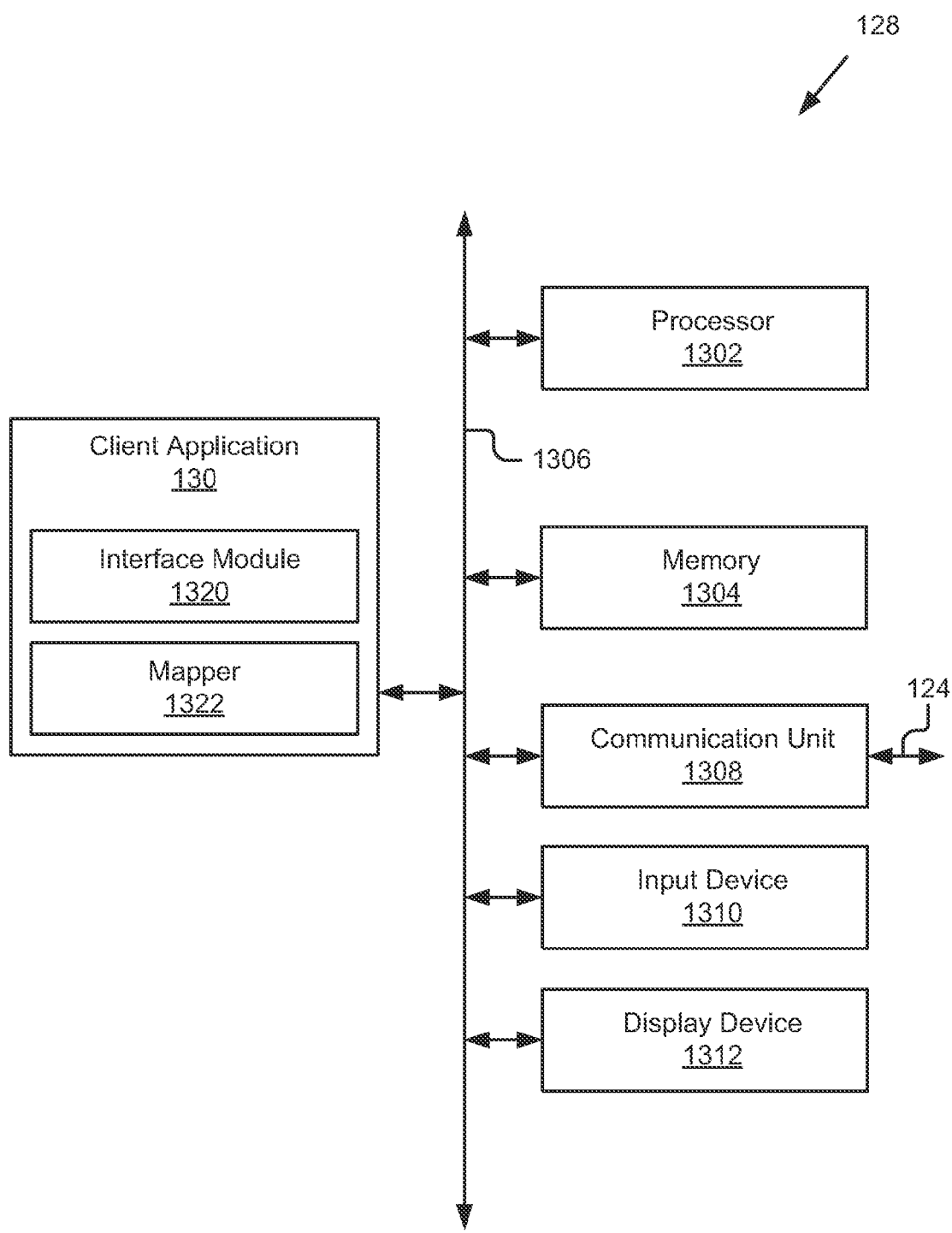
FIG. 13 is a block diagram of an example client device.

FIG. 13 is a block diagram of an example client device 128. As depicted, the client device 128 may include a processor 1302, memory 1304, communication unit 1308, input device 1310, and display device 1312, which are communicatively coupled by a communication bus 1306.

The processor 1302 may execute software instructions by performing various input/output, logical, and/or mathematical operations. The processor 1302 have various computing architectures to process data signals including, for example, a complex instruction set computer (CISC) architecture, a reduced instruction set computer (RISC) architecture, and/or an architecture implementing a combination of instruction sets. The processor 1302 may be physical and/or virtual, and may include a single core or plurality of processing units and/or cores.

The memory 1304 may store and provide access to data to the other components of the client device 128. In some embodiments, the memory 1304 may store instructions and/or data that may be executed by the processor 1302. For example, as depicted, the memory 1304 may store the client application 130. The memory 1304 is also capable of storing other instructions and data, including, for example, an operating system, hardware drivers, other software applications, data, etc. The memory 1304 may be coupled to the bus 1306 for communication with the processor 1302 and the other components of the client device 128.

The communication unit 1308 may include one or more interface devices (I/F) for wired and/or wireless connectivity with the network 102 and/or other devices. In some embodiments, the communication unit 1308 may include transceivers for sending and receiving wireless signals, such as Wi-Fi™, cellular, Bluetooth®, NFC, and other communication signals. For instance, the communication unit 1308 may connect to and send/receive data via a mobile network of the network 102, a public IP network of the network 102, a private IP network of the network 102, etc. In some embodiments, the communication unit 1308 may include ports for wired connectivity with other devices. For example, the communication unit 1308 may include a CAT-5 interface, USB interface, etc.

The display device 1312 may display electronic images and data output by the client device 128 for presentation to a user 134. The display device 1312 may include any conventional display device, monitor or screen, including, for example, an organic light-emitting diode (OLED) display, a liquid crystal display (LCD), etc. In some embodiments, the display device 1312 may be a touch-screen display capable of receiving input from one or more fingers of a user 134. For example, the display device 1312 may be a capacitive touch-screen display capable of detecting and interpreting multiple points of contact with the display surface. In some embodiments, the client device 128 may include a graphics adapter (not shown) for rendering and outputting the images and data for presentation on display device 1312. The graphics adapter (not shown) may be a separate processing device including a separate processor and memory (not shown) or may be integrated with the processor 1302 and memory 1304.

The input device 1310 may include any device for inputting information into the client device 128. In some embodiments, the input device 1310 may include one or more peripheral devices. For example, the input device 1310 may include a keyboard (e.g., a QWERTY keyboard), a pointing device (e.g., a mouse or touchpad), microphone, an image/video capture device (e.g., camera), etc. In some embodiments, the input device 1310 may include a touch-screen display capable of receiving input from the one or more fingers of the user 134. For instance, the functionality of the input device 1310 and the display device 1312 may be integrated, and a user 134 of the client device 128 may interact with the client device 128 by contacting a surface of the display device 1312 using one or more fingers. In this example, the user 134 could interact with an emulated (i.e., virtual or soft) keyboard displayed on the touch-screen display device 1312 by using fingers to contacting the display in the keyboard regions.

The client device 128 may include a client application 130 for generating and displaying user interfaces, receiving user input, and sending data to and receiving data from the other entities of the system 100, such as the enterprise system 104 and its constituent components. In some embodiments, the client application 130 may receive input signals from a user 134; generate data and instructions based on the input signals; and send the data and instructions to the enterprise system 104.

Figure 14:
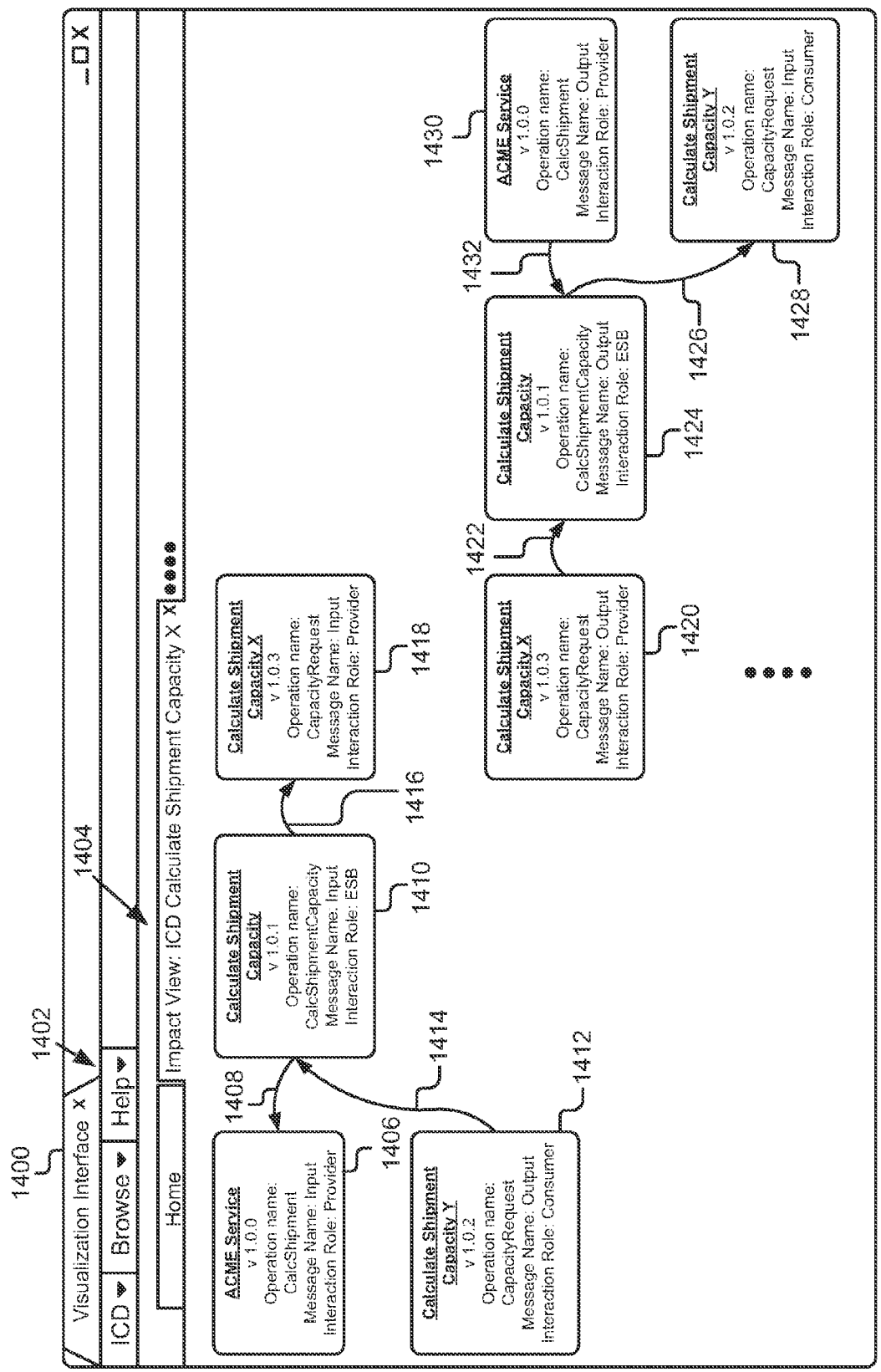
FIG. 14 is a graphic representation of an example user interface for visualizing an example integration.

In some embodiments, the client application 130 generates user interfaces, such as those depicted in FIGS. 14 and 15, based at least in part on information input by a user, retrieved from the memory 1304, and/or received from the enterprise system 104 via the network 102. In some embodiments the client application 130 may include a web-browser for executing client code received from the other of the system 100. For example, the client application 130 may receive, at least in part, interface instructions from the enterprise system 104 in the form of a mark-up language (e.g., HTML, XML, etc.), style sheets (e.g., CSS, XSL, etc.), graphics, and/or scripts (e.g., JavaScript, ActionScript, etc.), and the client application 130 may interpret the interface instructions and render an interactive Web User Interface (WUI) for display on a client device 128 based thereon. In other examples, the client application 130 may include and/or retrieve from the memory 1304 some or all of the interface instructions. In some embodiments, the client device 128 may include multiple client applications 130 for performing different integration-related activities. For instance, the client device 128 may include an application for working with ICDs and approval workflows and another application for working with mappings. In other embodiments, a single client application 130 may be used for all integration-related activity.

In the example depicted in FIG. 13, the client application 130 may include an interface module 1320, and a mapper 1322, although other configurations are also possible, such as where the client application 130, the interface module 1320, and/or the mapper 1322 are stand-alone components, integrated, or divided into additional components, etc. The components 130, 1320, and/or 1322 may be communicatively coupled by the bus 1306 and/or the processor 1302 to one another and/or the other components 1304, 1308, 1310, and 1312 of the client device 128. In some embodiments, one or more of the components 130, 1320, and/or 1322 are sets of instructions executable by the processor 1302 to provide their functionality. In some embodiments, one or more of the components 130, 1320, and/or 1322 are software instructions stored in the memory 1304 of the client device 128 and are accessible and executable by the processor 1302 to provide their functionality. In any of the foregoing embodiments, these components 130, 1320, and/or 1322 may be adapted for cooperation and communication with the processor 1302 and other components, such as local components of the client device 128 or remote components of the enterprise system 104.

The interface module 1320 is software, code, logic, and/or routines for enabling a user to work with ICDs, manage workflows, and perform impact analysis between services. The interface module 1320 may cooperate with the integration engine 114 to provide this functionality. In some embodiments, the interface module 1320 can enable the user to draft, publish, review, and approve ICDs in cooperation with the integration engine 114. For example, the interface module 1320 can function as a workflow tool interface for managing the lifecycle of the ICDs.

In some embodiments, the interface module 1320 can receive ICD and mapping-related information from the definition module 210 and provide it for presentation to the user for manipulation and the user may work with the information presented using, for example, various of the operations discussed above with reference to FIGS. 9A-10B, for example. In some embodiments, the interface module 1320 may cooperate with the visualization module 212 to enable a user to visualize how two or more services are integrated. For example, as depicted in FIGS. 14 and 15, the user interface module 1320 may receive and render visualization data from the visualization module 212 so a user may visualize how various operations a consumer service and a provider service are linked via the ESB 108 down to the semantic level, as discussed further herein with reference to those figures.

The interface module 1320 can also provide users with interfaces for versioning and branching ICDs; performing end-to-end impact analysis for changes being made to ICDs; searching ICDs (e.g., keyword searching); visualizing integrations end-to-end; performing power mapping sessions; filtering data based on business objects (e.g., canonical objects), application, project, review/approver, workflow status, protocols, service operations, etc.; rendering an ICD in a print friendly mechanism that can be used to print to PDF; providing a comparison between revisions; graphically browsing services and applications, including the ability to browse the ontology and data with boxes and arrows representation and to skip levels within an ontology (e.g., browsing directly from an application to its services); swim-lane tagging documents without increasing the version to help track the documents in different stages of the development life cycle (SDLC) (e.g., tagging and ICD or mapping as in development, QA, performance testing, etc.); supporting the consumption of the canonical interface of the ESB 108 (e.g., replicate the canonical semantics). In some embodiments, the interface 1320 engine integrates with a corporate governance product/enterprise management application, such as the registry module 115, to provide additional functionality to the user to manage the services/applications that have been or are being integrated with the ESB 108.

The mapper 1322 is software, code, logic, and/or routines for working with mappings. The mapper 1322 may cooperate with the integration engine 114 to provide this functionality. In some embodiments, the mapper 1322 can enable the user to clone, import, compose, modify, compare, and/or validate mappings in cooperation with the integration engine 114. In some embodiments, the mapper 1322 may receive ICD and mapping-related information from the definition module 210 and provide it for presentation to the user for manipulation and the user may work with the information presented using the functionality of the mapper 1322.

In some embodiments, the mapper 1322, may receive user input specifying data transformation rules for all the disparate systems included in the integration associated with the mapping; provide a user-selection mechanism to choose fields to map together; and provide the ability to perform request mapping, response mapping and error mapping. Additionally or alternatively, the mapper 1322 may provide interfaces for the user to validate whether required fields of the ICDs have been mapped to ensure data quality; validate whether the conditions of conditional fields of the ICDs have been met by the mapping; perform inconsistency checks when an ICD is changed after a mapping has been created; notify stakeholders via email of issues; annotate mapping documents with visual markings to flag inconsistencies; manage a mapping workflow process; determine default reviewers/approvers based on customizable rules; search mappings and ICDs; provide document revision and version control; provide mapping field revision control; render a mapping in print friendly mechanism that can be used to print to PDF; provide a comparison between mappings and mapping revisions; and support the consumption of the canonical interface directly (e.g., replicate the canonical semantics); etc.

In some embodiments, the interface module 1320 and the mapper 1322 are coupled via the network 102 to retrieve data, such as ICD, mapping, visualization, workflow data, etc. from the integration engine 114 and/or the integration data store 116 to store, update, retrieve, delete, etc., data stored thereby. The mapper 1322 and interface module 1320 may also be coupled may also be coupled to one another, the memory 1304, and/or other components of the system 100 to send and receive data.

It should be understood that the example client device 128 depicted in FIG. 13 is provided by way of illustration and that numerous different client device 128 configurations are contemplated, such as ones having a graphics processor; a high-resolution touchscreen; a physical keyboard; forward and rear facing cameras; sensors such as accelerometers and/or gyroscopes; a GPS receiver; a Bluetooth® module; memory storing applicable firmware; and various physical connection interfaces (e.g., USB, HDMI, headset jack, etc.); etc. Additionally, an operating system for managing the hardware and resources of the client device 128, application programming interfaces (APIs) for providing applications access to the hardware and resources, various applications, etc., may be stored and operable on the client device 128.

FIG. 14 is a graphic representation of an example user interface 1400 for visualizing an example integration. As depicted, the user interface 1400 includes a menu region 1402 and a tab region 1404. The menu region enables users to navigate and select various menu options, which may include options for working with ICDs and mappings, reviewing and approving ICD and mappings, receiving notifications, searching for ICDs and mappings, saving ICDs and mappings, managing workflows including the review and approval processes, etc. The tab region 1404 allows a user to retain several different tabs that contain different information, which the user may use switch back and forth between that information. In some embodiments, selecting an item (e.g., hyperlink) within the body of the user interface 1400 will open a new tab allowing the user to view additional information associated with the selected item.

In the example depicted in FIG. 14, the tab region may include a "home" tab and an "impact view" tab. Selecting the "home" tab may display an entry point for the user to access recently viewed documents (e.g., mappings, ICDs, workflows, etc.), message other users, view and respond to notifications, etc. Selecting the "impact view" may display a visualization of how ICDs are mapped. The user may have initialized the "impact view" tab by selecting a corresponding element in the "home" tab, the menu or browse options, or another element. In response to the selection, the visualization module 212 may generate and provide visualization data to the interface module 1320 for rendering and display to the user via the "impact view" tab.

As depicted, the "impact view" tab displays an example visualization of the ICD operations mapped by mappings. In particular, the example visualization shows how the operations of various provider and consumer services are linked via the ESB 108. For instance, as shown in block 1406, the ACME Service may provide a provider service that includes operation called CalcShipment for calculating shipment capacity. Similarly, as shown in block 1418, Calculate Shipment Capacity X may be a provider service that includes an operation called CapacityRequest for processing shipment capacity requests. Calculate Shipment Capacity Y, as shown in block 1412, may be a consumer service that includes an operation also called CapacityRequest for calculating shipment capacity based on the information received via the ESB 108 from ACME Service and Calculate Shipment Capacity X.

By way of further illustration, the output of the CapacityRequest operation in block 1412 may be mapped via the mapping element 1414 as an input to an ESB operation in block 1410 called CalcShipmentCapacity, and correspondingly the ESB operation in block 1410 may be mapped via the mappings 1408 and 1416 to transform and relay the output of the CapacityRequest operation in block 1412 as input to the CalcShipment and CalcRequest Operations in blocks 1406 and 1418, respectively.

Once the CalcShipment and CalcRequest operations have processed the input they received from the ESB (Block 1410), they may provide corresponding output in response. For example, the outputs of CalcShipment and CalcRequest operations in blocks 1430 and 1420 are mapped via the mappings 1432 and 1422 to the ESB operation CalcShipmentCapacity in block 1424, and correspondingly, the output of the ESB operation, which is based on the outputs received from blocks 1420 and 1430, is mapped via the mapping 1426 as input to the CapacityRequest operation in block 1428.

The user interface 1400 provides the user with the ability to drill deeper down into the visualization data that is being presented so the user can investigate on a per-field level the fields that have been mapped for a given integration. For instance, FIG. 15 is a graphic representation of an example user interface 1500 for visualizing semantic mappings associated with the integration. In some embodiments, the user may trigger the display of the information contained in user interface 1500 by selecting an item from the visualization data in user interface 1400. For instance, by selecting the block 1418 in user interface 1400, the user interface module 1320 may render more detailed visualization of the operation that corresponds with that block. In some embodiments, the user interface module 1320 may render the visualization based on visualization data received from the visualization module 212.

In particular, the example visualization data depicted in FIG. 15 may provide the user with detailed information about the services associated with the CapacityRequest operation represented by block 1418. As with user interface 1400, the user interface 1500 may include a menu region 1402 and a tab region 1404. As depicted, the selected "impact view" tab may include a summary region 1516 that displays the immediate operations that CapacityRequest of block 1418 is mapped to, the mappings that link them, and options 1502 and 1504 for sorting and filtering the fields that are associated with the services depicted in blocks 1408, 1410, and 1418 (i.e., ACME Service, Calculate Shipment Capacity, and Calculate Shipment Capacity X). The options 1502 and 1504 may be used by the user to limit and sort the fields displayed in the field display region 1514. For the fields that meet the filtering criteria, the tabs 1506 allow the user to switch the field display region 1514 to alternatively show which one have been mapped and which ones have not yet been mapped (are unmapped).

As depicted, the field display region 1514 includes rows 1512a . . . 1512n (also referred to herein individually and collectively as 1512) showing the fields (e.g., semantic elements) of the above-noted services that have been fully mapped and meet the filtering criteria. In particular, the first, third, and fifth columns of rows 1512a . . . 1512n show the names of the fields that have been mapped and their corresponding paths, and the second and fourth columns show the rules for transforming the fields so they are compatible with one another during an interaction between the services.

The mapping region 1508 displays the services depicted in blocks 1408, 1410, and 1418, as well as the mappings (transformation rules) that connect those services. Each of the items in the mapping region includes a switch element 1510 for collapsing/expanding the elements within the service region 1508 and field region. This is advantageous as it allows the user to expand the column of items (e.g., fields, rules) he/she is working with and collapse the columns of items that are unneeded. In some embodiments, columns may also be collapsed or expanded by selecting (e.g., clicking, touching) the corresponding element (e.g., 1406, 1408, 1410, 1416, 1418) in summary region 1516.

In the above description, for purposes of explanation, numerous specific details are set forth in order to provide a thorough understanding of the present disclosure. However, it should be understood that the technology described herein can be practiced without these specific details. Further, various systems, devices, and structures are shown in block diagram form in order to avoid obscuring the description. For instance, various embodiments are described as having particular hardware, software, and user interfaces. However, the present disclosure applies to any type of computing device that can receive data and commands, and to any peripheral devices providing services.

To ease description, some elements of the system 100 may be referred to using the labels first, second, third, etc. These labels are intended to help to distinguish the elements but do not necessarily imply any particular order or ranking unless indicated otherwise. Additionally, reference in the specification to "one embodiment," "an embodiment" or "some embodiments" means that a particular feature, structure, or characteristic described in connection with the embodiment is included in at least one embodiment of the disclosure. The appearances of the phrase "in one embodiment" or "in some embodiments" in various places in the specification are not necessarily all referring to the same embodiment(s).

In some instances, various embodiments may be presented herein in terms of algorithms and symbolic representations of operations on data bits within a computer memory. An algorithm is here, and generally, conceived to be a self-consistent set of operations leading to a desired result. The operations are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussion, it is appreciated that throughout this disclosure, discussions utilizing terms including "processing," "computing," "calculating," "determining," "displaying," or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Various embodiments described herein may relate to an apparatus for performing the operations herein. This apparatus may be specially constructed for the required purposes, or it may comprise a general-purpose computer selectively activated or reconfigured by a computer program stored in the computer. Such a computer program may be stored in a computer readable storage medium, including, but is not limited to, any type of disk including floppy disks, optical disks, CD-ROMs, and magnetic disks, read-only memories (ROMs), random access memories (RAMs), EPROMs, EEPROMs, magnetic or optical cards, flash memories including USB keys with non-volatile memory or any type of media suitable for storing electronic instructions, each coupled to a computer system bus.

The technology described herein can take the form of an entirely hardware embodiment, an entirely software embodiment, or embodiments containing both hardware and software elements. For instance, the technology may be implemented in software, which includes but is not limited to firmware, resident software, microcode, etc. Furthermore, the technology can take the form of a computer program product accessible from a computer-usable or computer-readable medium providing program code for use by or in connection with a computer or any instruction execution system. For the purposes of this description, a computer-usable or computer readable medium can be any non-transitory storage apparatus that can contain, store, communicate, propagate, or transport the program for use by or in connection with the instruction execution system, apparatus, or device.

A data processing system suitable for storing and/or executing program code may include at least one processor coupled directly or indirectly to memory elements through a system bus. The memory elements can include local memory employed during actual execution of the program code, bulk storage, and cache memories that provide temporary storage of at least some program code in order to reduce the number of times code must be retrieved from bulk storage during execution. Input/output or I/O devices (including but not limited to keyboards, displays, pointing devices, etc.) can be coupled to the system either directly or through intervening I/O controllers.

Network adapters may also be coupled to the system to enable the data processing system to become coupled to other data processing systems, storage devices, remote printers, etc., through intervening private and/or public networks.

Wireless (e.g., Wi-Fi™) transceivers, Ethernet adapters, and modems, are just a few examples of network adapters. The private and public networks may have any number of configurations and/or topologies. Data may be transmitted between these devices via the networks using a variety of different communication protocols including, for example, various Internet layer, transport layer, or application layer protocols. For example, data may be transmitted via the networks using transmission control protocol/Internet protocol (TCP/IP), user datagram protocol (UDP), transmission control protocol (TCP), hypertext transfer protocol (HTTP), secure hypertext transfer protocol (HTTPS), dynamic adaptive streaming over HTTP (DASH), real-time streaming protocol (RTSP), real-time transport protocol (RTP) and the real-time transport control protocol (RTCP), voice over Internet protocol (VoIP), file transfer protocol (FTP), WebSocket (WS), wireless access protocol (WAP), various messaging protocols (SMS, MMS, XMS, IMAP, SMTP, POP, WebDAV, etc.), or other known protocols.

Finally, the structure, algorithms, and/or interfaces presented herein are not inherently related to any particular computer or other apparatus. Various general-purpose systems may be used with programs in accordance with the teachings herein, or it may prove convenient to construct more specialized apparatus to perform the required method blocks. The required structure for a variety of these systems will appear from the description above. In addition, the specification is not described with reference to any particular programming language. It will be appreciated that a variety of programming languages may be used to implement the teachings of the specification as described herein.

The foregoing description has been presented for the purposes of illustration and description. It is not intended to be exhaustive or to limit the specification to the precise form disclosed. Many modifications and variations are possible in light of the above teaching. It is intended that the scope of the disclosure be limited not by this detailed description, but rather by the claims of this application. As will be understood by those familiar with the art, the specification may be embodied in other specific forms without departing from the spirit or essential characteristics thereof. Likewise, the particular naming and division of the modules, routines, features, attributes, methodologies and other aspects are not mandatory or significant, and the mechanisms that implement the specification or its features may have different names, divisions and/or formats.

Furthermore, the modules, routines, features, attributes, methodologies and other aspects of the disclosure can be implemented as software, hardware, firmware, or any combination of the foregoing. Also, wherever a component, an example of which is a module, of the specification is implemented as software, the component can be implemented as a standalone program, as part of a larger program, as a plurality of separate programs, as a statically or dynamically linked library, as a kernel loadable module, as a device driver, and/or in every and any other way known now or in the future. Additionally, the disclosure is in no way limited to implementation in any specific programming language, or for any specific operating system or environment. Accordingly, the disclosure is intended to be illustrative, but not limiting, of the scope of the subject matter set forth in the following claims.

What is claimed is:

1. A computer-implemented method comprising:
    determining, using one or more computing devices, a first semantic element of a first interface control document, the first semantic element representing a first operation included in a first application interface representing a first service, the first interface control document being a data set including properties of the first service;
    determining, using the one or more computing devices, a second semantic element of a second interface control document, the second semantic element representing a second operation included in a second application interface representing a second service, the second interface control document being a data set including properties of the second service, the second service including one of an enterprise service bus, and extract-transform-load framework, and a gateway;
    mapping, using the one or more computing devices, the first semantic element of the first interface control document with the second semantic element of the second interface control document; and
    integrating, using the one or more computing devices, the first application interface with the second service based on the mapping of the first semantic element of the first interface control document with the second semantic element of the second interface control document.

2. The computer-implemented method of claim 1, wherein the first semantic element includes a field associated with an input message of the first operation, and the second semantic element includes a field associated with one of an output message and an error message of the second operation.

3. The computer-implemented method of claim 1, wherein the first semantic element includes a field associated with an output message of the first operation, and the second semantic element includes a field associated with one of an input message and an error message of the second operation.

4. The computer-implemented method of claim 1, further comprising:
    receiving, using the one or more computing devices, the first interface control document associated with the first service, the first interface control document describing a functionality of the first operation and including the first semantic element;
    receiving, using the one or more computing devices, the second interface control document associated with a canonical information model of an enterprise service bus, the second service including the enterprise service bus, the second operation being an operation supported by the enterprise service bus, and the second interface control document describing a functionality of the second operation and including the second semantic element; and
    storing, using the one or more computing devices, the first interface control document and the second interface control document in a centralized repository; wherein the mapping of the first semantic element with the second semantic element includes connecting the first semantic element with the second semantic element in the centralized repository.

5. The computer-implemented method of claim 4, further comprising:
    obtaining, using the one or more computing devices, approval of one or more of the first interface control document, the second interface control document, and the mapping, wherein the integrating the first application interface with the enterprise service bus is further based on the approval.

6. The computer-implemented method of claim 1, further comprising:

generating, using the one or more computing devices, visualization data that graphically illustrates the mapping of the first semantic element with the second semantic element; and providing, using the one or more computing devices, the visualization data for display to a user.

7. The computer-implemented method of claim 1, further comprising:

determining, using the one or more computing devices, a third semantic element for a third operation included in a third application interface representing a third service;

mapping, using the one or more computing devices, the third semantic element to the second semantic element; and integrating, using the one or more computing devices, the third application interface with the second service based on the mapping of the third semantic element with the second semantic element, wherein the second service includes an enterprise service bus and the integrating of the third application interface with the second service integrates the third application interface with the enterprise service bus.

8. The computer-implemented method of claim 7, wherein the first service is a consumer service and the third service is a provider service, and the first operation requests that the second operation call the third operation to provide a resource.

9. The computer-implemented method of claim 7, further comprising:

generating, using the one or more computing devices, visualization data that graphically illustrates the mapping between the first semantic element and the third semantic element via the second semantic element; and providing, using the one or more computing devices, the visualization data for display to a user.

10. The computer-implemented method of claim 1, further comprising:

validating, using the one or more computing devices, the mapping of the first semantic element with the second semantic element.

11. The computer-implemented method of claim 10, wherein the validating of the mapping of the first semantic element with the second semantic element includes verifying one or more of whether the first semantic element and the second semantic element are compatible, whether a required semantic element of the first application interface or the second application interface has been mapped, and whether a semantic element that has been incorporated by reference is valid.

12. The computer-implemented method of claim 10, wherein the validating of the mapping further includes determining the mapping to include an error and notifying a stakeholder about the error via an electronic message.

13. A computer program product comprising a non-transitory computer readable medium including a computer readable program, wherein the computer readable program when executed on a computer causes the computer to:

determine a first semantic element of a first interface control document, the first semantic element representing a first operation included in a first application interface representing a first service, the first interface control document being a data set including properties of the first service;

determine a second semantic element of a second interface control document, the second semantic element representing a second operation included in a second application interface representing a second service, the second interface control document being a data set including properties of the second service, the second service including one of an enterprise service bus, and extract-transform-load framework, and a gateway;

determine a mapping of the first semantic element of the first interface control document with the second semantic element of the second interface control document; and integrate the first application interface with the second service based on the mapping of the first semantic element of the first interface control document with the second semantic element of the second interface control document.

14. The computer program product of claim 13, wherein the first semantic element includes a field associated with an input message of the first operation, and the second semantic element includes a field associated with one of an output message and an error message of the second operation.

15. The computer program product of claim 13, wherein the first semantic element includes a field associated with an output message of the first operation, and the second semantic element includes a field associated with one of an input message and an error message of the second operation.

16. The computer program product of claim 13, wherein the computer readable program, when executed, further causes the computer to:

receive the first interface control document associated with the first service, the first interface control document describing a functionality of the first operation and including the first semantic element;

receive the second interface control document associated with a canonical information model of an enterprise service bus, the second service including the enterprise service bus, the second operation being an operation supported by the enterprise service bus, and the second interface control document describing a functionality of the second operation and including the second semantic element; and store the first interface control document and the second interface control document in a centralized repository;

wherein to determine the mapping of the first semantic element with the second semantic element includes connecting the first semantic element with the second semantic element in the centralized repository.

17. The computer program product of claim 16, wherein the computer readable program, when executed, further causes the computer to:

obtain approval of one or more of the first interface control document, the second interface control document, and the mapping, wherein to integrate the first application interface with the enterprise service bus is further based on the approval.

18. The computer program product of claim 13, wherein the computer readable program, when executed, further causes the computer to:

generate visualization data that graphically illustrates the mapping of the first semantic element with the second semantic element; and provide the visualization data for display to a user.

19. The computer program product of claim 13, wherein the computer readable program, when executed, further causes the computer to:

determine a third semantic element for a third operation included in a third application interface representing a third service;

determine a mapping of the third semantic element with the second semantic element; and integrate the third application interface with the second service based on the mapping of the third semantic element with the second semantic element, wherein the second service includes an enterprise service bus and to integrate the third application interface with the second service integrates the third application interface with the enterprise service bus.

20. The computer program product of claim 19, wherein the first service is a consumer service and the third service is a provider service, and the first operation requests that the second operation call the third operation to provide a resource.

21. The computer program product of claim 19, wherein the computer readable program, when executed, further causes the computer to:

generate visualization data that graphically illustrates the mapping between the first semantic element and the third semantic element via the second semantic element; and provide the visualization data for display to a user.

22. The computer program product of claim 13, wherein the computer readable program, when executed, further causes the computer to:

validate the mapping of the first semantic element with the second semantic element.

23. The computer program product of claim 22, wherein to validate the mapping of the first semantic element with the second semantic element includes verifying one or more of whether the first semantic element and the second semantic element are compatible, whether a required semantic element of the first application interface or the second application interface has been mapped, and whether a semantic element that has been incorporated by reference is valid.

24. The computer program product of claim 22, wherein to validate the mapping further includes determining the mapping to include an error and notifying a stakeholder about the error via an electronic message.

25. A system comprising:
one or more processors;
a definition module executable by the one or more processors to determine a first semantic element of a first interface control document, the first semantic element representing a first operation included in a first application interface representing a first service, the first interface control document being a data set including properties of the first service, and a second semantic element of a second interface control document, the second semantic element representing a second operation included in a second application interface representing a second service, the second interface control document being a data set including properties of the second service, the second service including one of an enterprise service bus, and extract-transform-load framework, and a gateway, and to determine a mapping of the first semantic element of the first interface control document with the second semantic element of the second interface control document;
a data store configured to store the mapping of the first semantic element with the second semantic element by the definition module; and
a workflow module executable by the one or more processors to integrate the first application interface with the second service based on the mapping, the workflow module coupled to the data store to access the mapping.

26. The system of claim 25, wherein the first semantic element includes a field associated with an input message of the first operation, and the second semantic element includes a field associated with one of an output message and an error message of the second operation.

27. The system of claim 25, wherein the first semantic element includes a field associated with an output message of the first operation, and the second semantic element includes a field associated with one of an input message and an error message of the second operation.

28. The system of claim 25, wherein:
the definition module is further configured to receive the first interface control document associated with the first service, to receive the second interface control document associated with a canonical information model of an enterprise service bus, and to store the first interface control document and the second interface control document in the data store, the data store being a centralized repository and the second service including the enterprise service bus, the first interface control document describes a functionality of the first operation and includes the first semantic element, the second interface control document describes a functionality of the second operation and includes the second semantic element, the second operation being an operation supported by the enterprise service bus, and the centralized repository is configured to connect the first semantic element with the second semantic element based on the mapping.

29. The system of claim 25, wherein the workflow module is further configured to:

obtain approval of one or more of the first interface control document, the second interface control document, and the mapping, wherein to integrate the first application interface with the enterprise service bus is further based on the approval.

30. The system of claim 25, further comprising:
a visualization module executable by the one or more processors to generate visualization data that graphically illustrates the mapping of the first semantic element with the second semantic element and to provide the visualization data for display to a user.

31. The system of claim 25, wherein the definition module is further configured to:

determine a third semantic element for a third operation included in a third application interface representing a third service;

determine a mapping of the third semantic element with the second semantic element; and integrate the third application interface with the second service based on the mapping of the third semantic element with the second semantic element, wherein the second service includes an enterprise service bus and to integrate the third application interface with the second service integrates the third application interface with the enterprise service bus.

32. The system of claim 31, wherein the first service is a consumer service and the third service is a provider service, and the first operation requests that the second operation call the third operation to provide a resource.

33. The system of claim 31, further comprising:
a visualization module executable by the one or more processors to generate visualization data that graphically illustrates the mapping between the first semantic element and the third semantic element via the second semantic element and to provide the visualization data for display to a user.

34. The system of claim 25, wherein the definition module is further configured to validate the mapping of the first semantic element with the second semantic element.

35. The system of claim 34, wherein to validate the mapping of the first semantic element with the second semantic element includes verifying one or more of whether the first semantic element and the second semantic element are compatible, whether a required semantic element of the first application interface or the second application interface has been mapped, and whether a semantic element that has been incorporated by reference is valid.

36. The system of claim 34, wherein the definition module is further configured to validate the mapping by determining the mapping to include an error and notifying a stakeholder about the error via an electronic message.

37. The computer-implemented method of claim 2, wherein the mapping maps the field associated with the input message of the first operation to the field associated with the one of the output message and the error message of the second operation using a transformation rule.

38. The computer program product of claim 14, wherein the mapping maps the field associated with the input message of the first operation to the field associated with the one of the output message and the error message of the second operation using a transformation rule.

39. The system of claim 26, wherein the mapping maps the field associated with the input message of the first operation to the field associated with the one of the output message and the error message of the second operation using a transformation rule.

* * * * *